(12) United States Patent
Nilsen et al.

(10) Patent No.: US 7,364,314 B2
(45) Date of Patent: Apr. 29, 2008

(54) OPTICAL STRUCTURES

(75) Inventors: Robert B. Nilsen, Mystic, CT (US); William P. Rowland, Southington, CT (US)

(73) Assignee: Reflexite Corporation, Avon, CT (US)

( * ) Notice: Subject to any disclaimer, the term of this patent is extended or adjusted under 35 U.S.C. 154(b) by 469 days.

(21) Appl. No.: 10/731,416

(22) Filed: Dec. 9, 2003

(65) Prior Publication Data

US 2004/0169928 A1 Sep. 2, 2004

Related U.S. Application Data

(63) Continuation-in-part of application No. 10/438,759, filed on May 15, 2003, now abandoned.

(60) Provisional application No. 60/380,990, filed on May 15, 2002.

(51) Int. Cl.
*G02B 5/124* (2006.01)

(52) U.S. Cl. .................. 359/530; 359/831; 359/900; 428/323

(58) Field of Classification Search .................. None
See application file for complete search history.

(56) References Cited

U.S. PATENT DOCUMENTS

| 2,937,668 | A | 5/1960 | Carey, Jr. et al. |
| 3,140,340 | A | 7/1964 | Weber |
| 3,281,396 | A | 10/1966 | Barnes |
| 3,684,348 | A | 8/1972 | Rowland |
| 3,931,115 | A | 1/1976 | Strassel |
| 4,004,930 | A | 1/1977 | Tung |
| 4,025,159 | A | 5/1977 | McGrath |
| 4,100,625 | A | 7/1978 | Tung |

(Continued)

FOREIGN PATENT DOCUMENTS

EP 0 478 178 A1 4/1992

(Continued)

OTHER PUBLICATIONS

Cook, G., "No Assembly Required for These Tiny Machines," Boston Globe, Oct. 16, 2001, http://web.mit.edu/lms/www/011016globe.shtml.

(Continued)

*Primary Examiner*—James Phan
(74) *Attorney, Agent, or Firm*—Hamilton, Brook, Smith & Reynolds, P.C.

(57) ABSTRACT

Optical structures and methods for manufacturing the same includes, in one embodiment, a substrate and a plurality of two-sided optical components disposed along the substrate. Each component includes optical microstructures on each side. At least a portion of one side of at least some of the components is air-backed and the other side of the at least some of the components is substantially wetted-out by a material. Retroreflective optical structures, threads, or fibers and manufacturing methods for forming same are also provided. Optical structures are provided that include a plurality of microstructures enclosed within an outer layer that is formed from a single substrate. An apparatus and method are also provided for forming an optical structure comprising injecting a material into a mold to form the optical structure, forming the optical structure into a desired geometric shape, and sealing ends of the optical structure.

20 Claims, 27 Drawing Sheets

U.S. PATENT DOCUMENTS

| | | |
|---|---|---|
| 4,202,600 A | 5/1980 | Burke et al. |
| 4,211,261 A | 7/1980 | Mehta et al. |
| 4,254,176 A | 3/1981 | Müller et al. |
| 4,425,468 A | 1/1984 | Makhlouf et al. |
| 4,555,161 A | 11/1985 | Rowland |
| 4,576,850 A | 3/1986 | Martens |
| 4,618,518 A | 10/1986 | Pricone et al. |
| 5,039,200 A | 8/1991 | Michler et al. |
| 5,126,170 A | 6/1992 | Zwiener et al. |
| 5,182,663 A | 1/1993 | Jones |
| 5,236,741 A | 8/1993 | Zwiener et al. |
| 5,272,562 A | 12/1993 | Coderre |
| 5,300,263 A | 4/1994 | Hoopman et al. |
| 5,521,725 A | 5/1996 | Beeson et al. |
| 5,565,151 A | 10/1996 | Nilsen |
| 5,614,286 A | 3/1997 | Bacon, Jr. et al. |
| 5,657,162 A | 8/1997 | Nilsen et al. |
| 5,657,408 A | 8/1997 | Ferm et al. |
| 5,706,132 A | 1/1998 | Nestegard et al. |
| 5,805,338 A | 9/1998 | Janovec |
| 5,805,339 A | 9/1998 | Martin et al. |
| 5,835,271 A | 11/1998 | Stump et al. |
| 5,836,674 A | 11/1998 | Nishitani et al. |
| 5,840,352 A | 11/1998 | Shimizu et al. |
| 5,840,405 A | 11/1998 | Shusta et al. |
| 5,905,826 A | 5/1999 | Benson, Jr. et al. |
| 5,936,770 A | 8/1999 | Nestegard et al. |
| 5,956,818 A | 9/1999 | Tsubata |
| 5,985,444 A | 11/1999 | Olson et al. |
| 5,995,690 A | 11/1999 | Kotz et al. |
| 6,036,322 A | 3/2000 | Nilsen et al. |
| 6,039,909 A | 3/2000 | Bernard et al. |
| 6,050,691 A | 4/2000 | Fellows et al. |
| 6,107,436 A | 8/2000 | Goeb et al. |
| 6,130,730 A | 10/2000 | Jannson et al. |
| 6,142,643 A | 11/2000 | Araki et al. |
| 6,143,224 A | 11/2000 | Bernard et al. |
| 6,163,402 A | 12/2000 | Chou et al. |
| 6,191,200 B1 | 2/2001 | Phillips |
| 6,197,393 B1 | 3/2001 | Jing et al. |
| 6,291,586 B2 | 9/2001 | Lasch et al. |
| 6,303,058 B1 | 10/2001 | Kelley et al. |
| 6,322,236 B1 | 11/2001 | Campbell et al. |
| 6,323,266 B2 | 11/2001 | Phillips |
| 6,350,823 B1 | 2/2002 | Goeb et al. |
| 6,372,341 B1 | 4/2002 | Jung et al. |
| 6,521,718 B2 | 2/2003 | Goeb et al. |
| 6,533,961 B2 | 3/2003 | Harelstad et al. |
| 2001/0050356 A1 | 12/2001 | Crano et al. |
| 2002/0002929 A1 | 1/2002 | Harelstad et al. |
| 2002/0016421 A1 | 2/2002 | Goeb et al. |
| 2002/0018299 A1 | 2/2002 | Daniell |

FOREIGN PATENT DOCUMENTS

| | | |
|---|---|---|
| EP | 0 675 148 A1 | 10/1995 |
| EP | 0 835 348 B1 | 10/2001 |
| JP | 05-209142 | 8/1993 |
| JP | 07-258370 | 10/1995 |
| WO | WO 97/01675 | 1/1997 |
| WO | WO 99/23151 | 5/1999 |
| WO | WO 00/14525 | 3/2000 |
| WO | WO 00/43813 A1 | 7/2000 |
| WO | WO 03/098276 A2 | 11/2003 |

OTHER PUBLICATIONS

Dagani, R., "Self-Assembly Required," Chemical & Engineering News Today: News of the Week, Apr. 12, 2002, http://pubsacs.org/cen/today/april12d.html.

Kirkland, C., "A First in Micromold Flow Analysis," May 2003, http://www.immnet.com/articles?article=2130.

OPTICAL STRUCTURES

RELATED APPLICATION

This application is a Continuation-in-Part Application of U.S. application Ser. No. 10/438,759, filed May 15, 2003, now abandoned which claims the benefit of U.S. Provisional Application No. 60/380,990, filed May 15, 2002. The entire teachings of each application are incorporated herein by reference.

BACKGROUND

Retroreflective materials are employed for various safety and decorative purposes. Particularly, these materials are useful at nighttime when visibility is important under low light conditions. With perfect retroreflective materials, light rays are reflected essentially towards a light source in a substantially parallel path along an axis of retroreflectivity.

Many types of retroreflective material exist for various purposes. These retroreflective materials can be used as reflective tapes and patches for clothing, such as vests and belts. Also, retroreflective materials can be used on posts, barrels, traffic cone collars, highway signs, warning reflectors, etc. Retroreflective material can be comprised of arrays of randomly oriented micron diameter spheres or close packed cube-corner (prismatic) arrays.

Cube-corner or prismatic retroreflectors are described in U.S. Pat. No. 3,712,706, issued to Stamm on Jan. 23, 1973, the teachings of which are incorporated herein by reference. Generally, the prisms are made by forming a master negative die on a flat surface of a metal plate or other suitable material. To form the cube-corners, three series of V-shaped grooves, each series of grooves being parallel and equidistant to the other grooves in the same series, are inscribed in the flat plate such that the grooves intersect at 60 degrees. The die is then used to process the desired cube-corner array into a rigid flat plastic surface.

Further details concerning the structures and operation of cube-corner microprisms can be found in U.S. Pat. No. 3,684,348, issued to Rowland on Aug. 15, 1972, the teachings of which are incorporated herein by reference. A method for making retroreflective sheeting is also disclosed in U.S. Pat. No. 3,689,346, issued to Rowland on Sep. 5, 1972, the teachings of which are incorporated herein by reference. The disclosed method is for forming cube-corner microprisms in a cooperatively configured mold. The prisms are bonded to sheeting that is applied thereover to provide a composite structure in which the cube-corner formations project from one surface of the sheeting.

SUMMARY

Prior art manufacturing methods have suffered from the inability to produce wide sheets having a microstructured surface. Typically, sheets up to about 14 inches in width are pieced together to form a large area surface. However, the seam is usually very difficult to functionally hide and is almost always noticeable to the viewer. The tooling required to produce a wide sheet, which could be used, for example, in a rear projection television, is exceptionally expensive.

Novel optical structures having a microstructured surface have been discovered. In one embodiment, an optical structure and a method for manufacturing the same is provided that includes a substrate and a plurality of two-sided optical components disposed along the substrate. Each component includes optical microstructures on each side. At least a portion of one side of at least some of the components is air-backed and the other side of the at least some of the components is substantially wetted-out by a material.

The microstructures can include cube-corner prisms, diffractive structures and lenses, lens arrays, prism arrays, linear Fresnel lenses, lenslets, alphanumeric characters, digital structures (e.g., raised structures that are designed to carry information that is binary, for example, a bar code), colored structures, color shifting structures, textured structures, moth-eye structures, linear prisms and lenses, lenslets, fish-eye lens arrays, or other suitable microstructures. The resulting optical structure can be used in retroreflective product concepts, front projection screens that include air spheres, diffusion screens that include air spheres, louvre films that can be used for privacy, light control, collimation applications, and anti-glare films that use moth-eye or other optical microstructures.

In other embodiments, retroreflective optical structures, threads, or fibers and manufacturing methods for forming same are set forth below.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
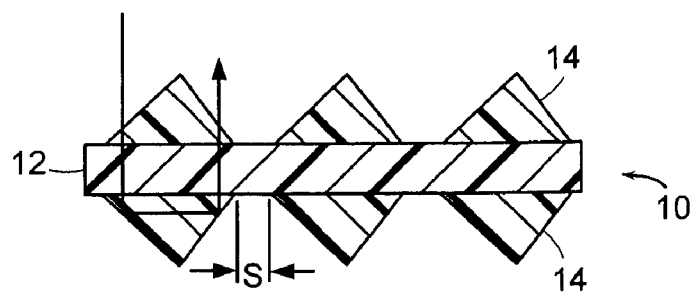
FIG. 1 is a sectional view of one embodiment of a two-sided optical component.

A description of various embodiments follows. FIG. 1 is a sectional view of one embodiment of a two-sided component, chip, or flake, and referred to herein as a component, and is designated generally as reference numeral 10. A substrate 12, which can be substantially transparent or optically clear, supports a plurality of elements 14, such as retroreflective cube-corner prisms. In alternative embodiments, each component is two-sided, with each side having optical microstructures. The microstructures can include, for example, moth-eye structures, cube-corner prisms, linear prisms, lenslets, fish-eye lens arrays, and/or other suitable optical structures.

As will be explained below with reference to certain embodiments, the component 10 is wetted-out on one side and air-backed on the other side such that light passes through the wetted-out cube-corner prisms 14 on one side of the substrate 12 and is retroreflected by the air-backed prisms 14 on the other side of the substrate. In one embodiment, the cube-corner prisms 14 are formed from a substantially transparent or optically clear material. The cube-corner prisms 14 can be spaced apart (S) along the substrate 12 such that the three-sided base that extends to an apex of one prism does not touch the base of an adjacent prism. In other embodiments, the elements 14 include a moth-eye structure, such as disclosed in U.S. Pat. No. 4,013,465, issued to Clapham et al. on Mar. 22, 1977, the teachings of which are incorporated herein by reference.

Figure 2:
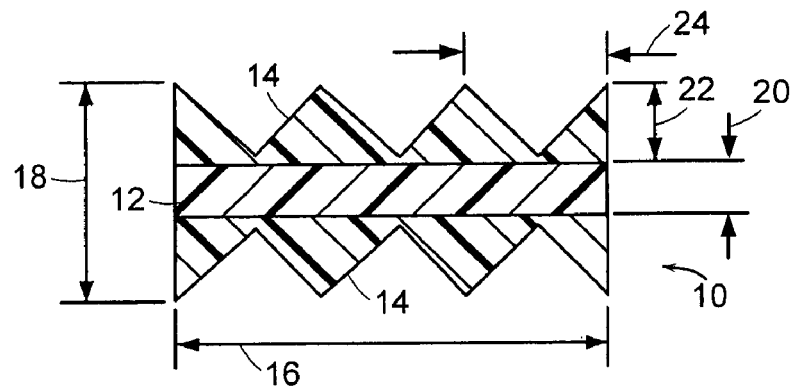
FIG. 2 is a sectional view of another embodiment of a two-sided optical component.

FIG. 2 is a sectional view of another embodiment of a two-sided component 10 in which the cube-corner prisms 14 are contiguous and not spaced apart. In this embodiment, the component 10 has a length 16 of between about 0.076 and 0.457 mm (0.003 and 0.018 inches). Retroreflective sheeting having prisms 14 formed on either side can be cut, such as mechanically or with a laser, or formed into components 10 having these or other dimensions. The thickness 18 from apex to opposing apex can have a range of between about 0.0381 and 0.193 mm (0.0015 and 0.0076 inches). The thickness 20 of the substrate 12 can have a range of between about 0.0127 and 0.051 mm (0.0005 and 0.002 inches). The distance 22 from the substrate 12 to the apex of a prism 14 can have a range of between about 0.0127 and 0.071 mm (0.0005 and 0.0028 inches). The distance 24 from apex to adjacent apex can have a range of between about 0.025 and 0.152 mm (0.001 and 0.006 inches).

The length 16 to width 18 aspect ratio is such that the component 10 usually, when dropped on a surface, lands on one of the larger area sides in accordance with one aspect of the invention. That is, a component 10 dropped onto a flat surface often orients itself as shown in FIG. 2, i.e., substantially horizontal, with the substrate 12 being parallel to the flat surface. Other methods of positioning the components 10 are described below.

In any of the embodiments disclosed herein, different size elements, prisms, or optical microstructures can be used to achieve unique retroreflected light distributions. For example, the length along the base edge of different prisms can vary in a single component 10 or between components. Also, the prisms 14 can be tilted or canted with respect to an optical axis as disclosed in U.S. Pat. No. 5,171,624, issued on Dec. 15, 1992 to Walter, or tilted and oriented as discussed in U.S. Pat. No. 3,684,348, issued to Rowland on Aug. 15, 1972, the teachings of which are incorporated herein by reference. The prisms 14 can be tilted at different angles in the positive or negative direction on the same or different components 10 and be oriented in different directions to achieve unique retroreflected light distributions.

Figure 3:
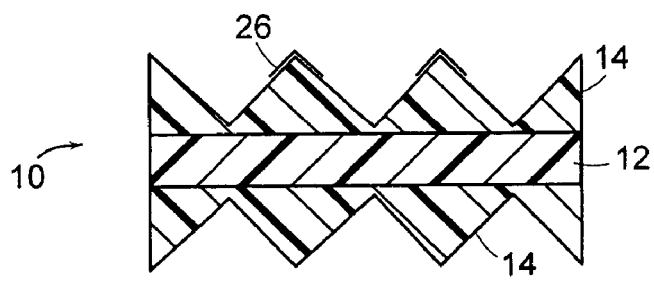
FIG. 3 is a sectional view of a two-sided optical component having a color coating on the prism tips.
Figure 4:
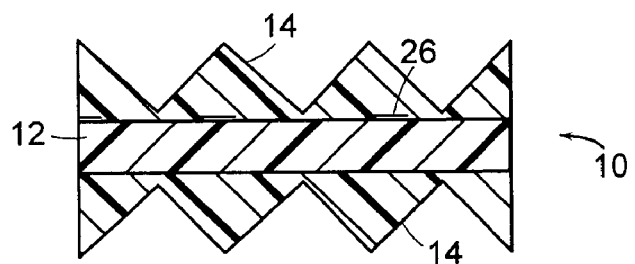
FIG. 4 is a sectional view of a two-sided optical component having color coatings between the substrate and prisms.
Figure 5:
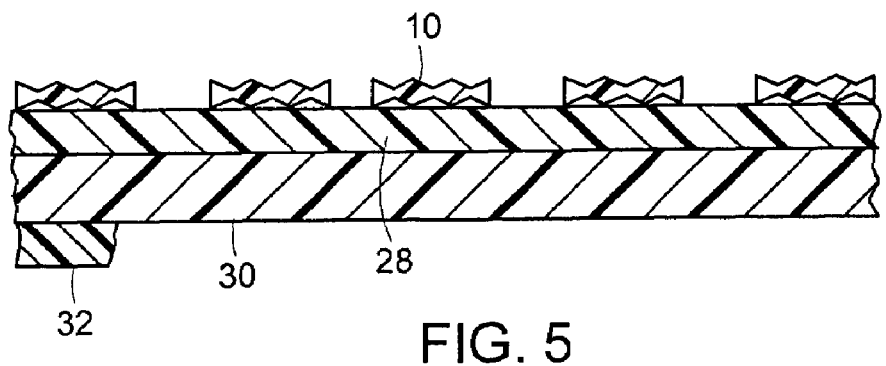
FIG. 5 is a sectional view of two-sided optical components spread across a substrate.

As shown in FIGS. 3 and 4, color can be added to the component 10 to further provide unique retroreflected light distributions. In one embodiment as shown in FIG. 3, a color coating 26 can be added to some or all of the prism tips. In other embodiments, the color coating 26 can be formed over the entire facet. As shown in FIG. 4, the color coating 26 can be disposed between the substrate 12 and the prisms 14. Single or multiple color combinations can be used on the same or different components 10. In other embodiments, fluorescent color or colors can be used in the color coatings.

FIGS. 5-10 illustrate an embodiment of the present invention in which components 10 are first spread across a substrate 28, such as a substantially transparent heat-activated or pressure-sensitive adhesive coating, that has been applied to a substantially transparent substrate 30 or top film. An optional carrier film 32 can be disposed along the top film 30. The spacing of the components 10 can be controlled to achieve the amount of coverage desired. In one embodiment, the components 10 can overlap to increase the tilt of the components.

Figure 6:
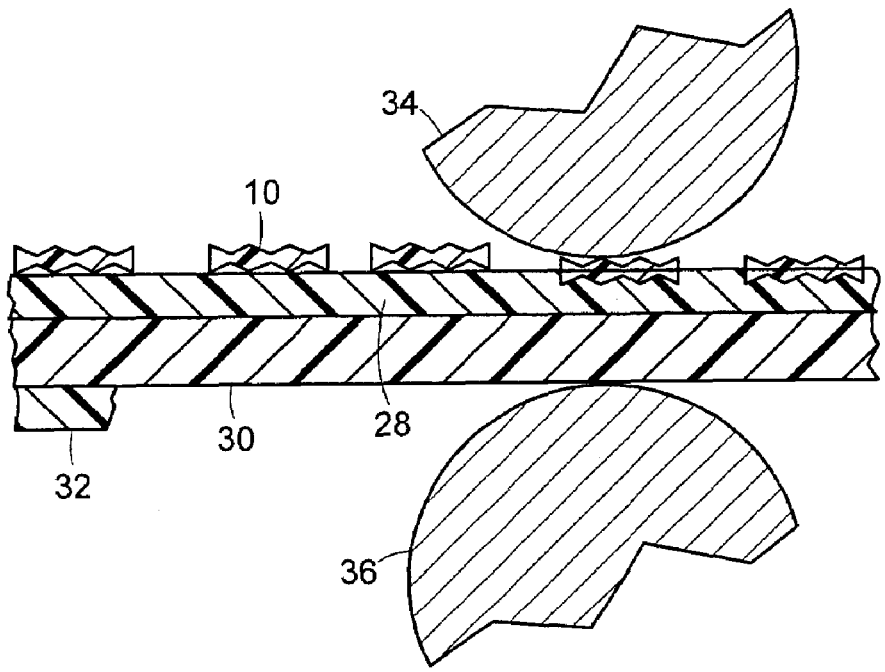
FIG. 6 illustrates one embodiment of partially embedding the components of FIG. 5 into the underlying substrate.

FIG. 6 illustrates one embodiment of partially embedding the components 10 into the adhesive 28. In this embodiment, the structure is passed between laminating rolls 34, 36 to push the bottom side of the component 10 into the adhesive 28 to wet-out the prism facets 14 on the side that is embedded within the adhesive. Adhesive 28 can be softened, for example, with radiant heat, prior to encountering the lamination rolls 34, 36. In a particular embodiment, roll 34 is a heated roll and roll 36 is a cold roll. It is contemplated that there are other ways of partially embedding the components 10 into the adhesive 28, such as by using compressed air. The adhesive 28 can have the same index of refraction as the material that forms the components 10 unless some additional light redirection is desired.

Figure 7:
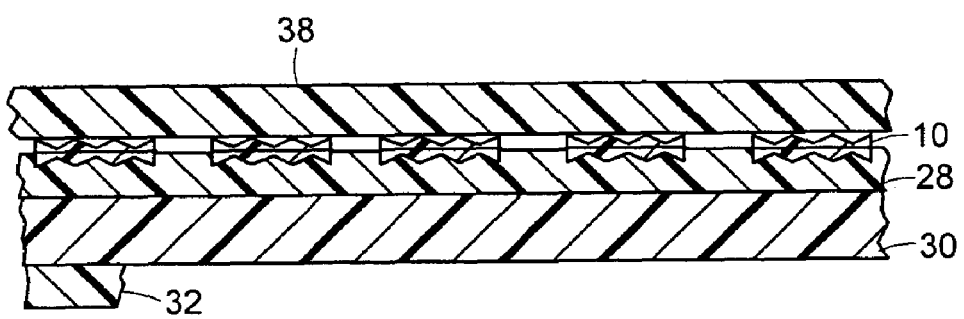
FIG. 7 illustrates a backing layer applied onto the exposed prism side of the partially embedded components of FIG. 6.

As shown in FIG. 7, a backing layer or film 38 can be applied onto the exposed prism side of the components 10. In one embodiment, the backing layer 38 is laid upon the exposed prisms at low pressure to prevent damaging the exposed prism tips. The backing layer 38, adhesive 28, top film 30, and/or carrier film 32 can include any color including fluorescent color to achieve a desired product appearance. In one embodiment, backing layer 38 can be formed from a soft white material. In other embodiments, the backing layer 38 is formed from a substantially transparent material for forming a transflector type product. Generally, these transflectors have light transmitted through the retroreflective structure from the back as in back-lit signs used at airports or for bollards.

Figure 8:
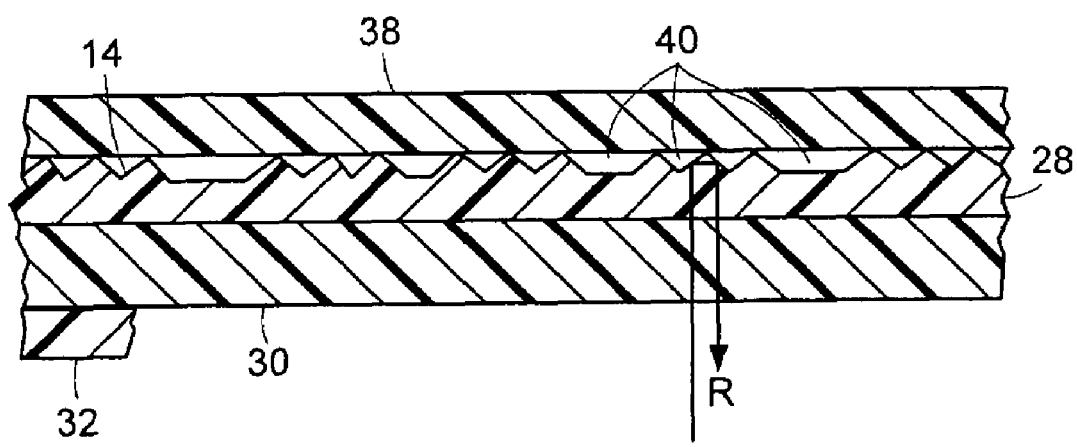
FIG. 8 is a sectional view of the optical structure formed in FIGS. 5-7.

If the index of refraction is substantially the same between the prisms 14, adhesive 28, top film 30, and carrier film 32, no boundaries are present and there is no Fresnel reflection or scattering losses at these interfaces, as shown in FIG. 8. Air pockets are designated as reference numeral 40. This light ray R is retroreflected by the structure as the non-wetted side of the component 10 functions as the air-backed retroreflector.

Figure 9:
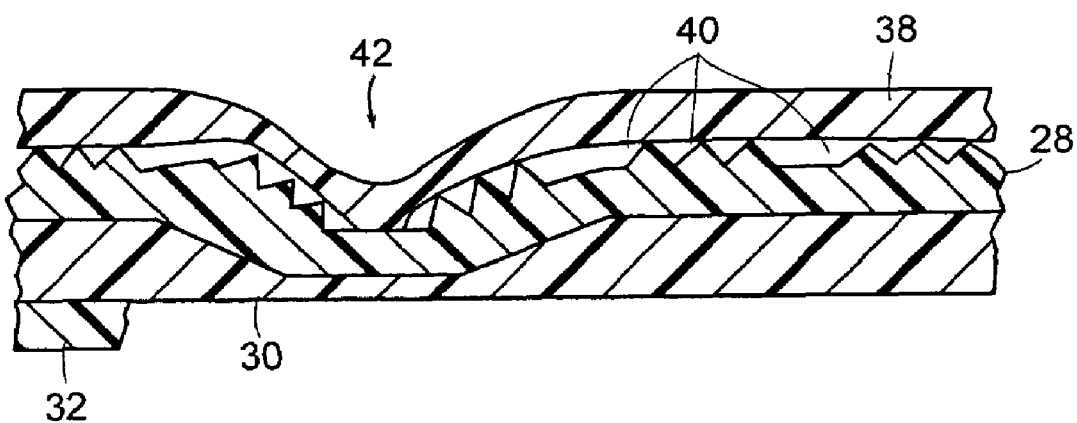
FIG. 9 illustrates one embodiment of bonding the backing layer to the retroreflective structure.

FIG. 9 illustrates one embodiment of bonding the backing layer 38 to the retroreflective structure. In this embodiment, a sealing die with a cellular footprint and narrow lands is used to heat and push the backing layer 38 down to a point or area 42 where it bonds to the existing adhesive 28. In other embodiments, some of the backing layer 38 is pushed through the adhesive 28 and bonds to the top film 30. Radio frequency (RF) sealing, ultrasonic sealing, and hot lamination can also be used to bond the backing layer 38 to the structure. In any of the embodiments disclosed herein, the structures can be sealed or processed as disclosed in U.S. Pat. Nos. 6,039,909 and 6,143,244, the teachings of which are incorporated herein by reference. Optionally, a pattern adhesive can be applied to the backing layer and laminated to the product construction.

Figure 10:
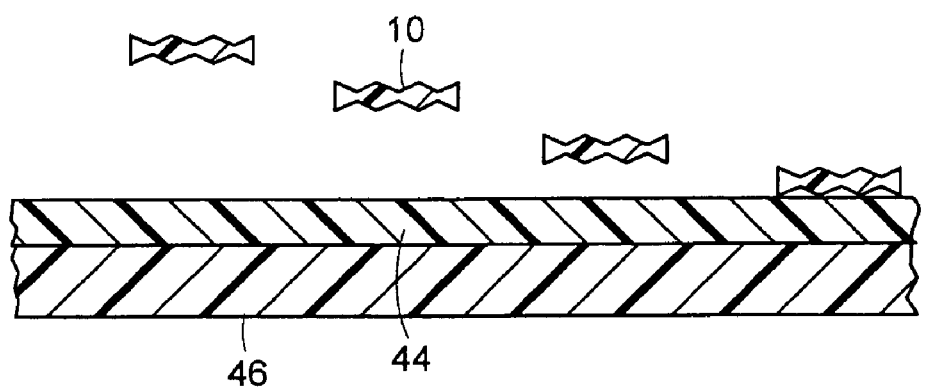
FIG. 10 illustrates two-sided optical components being dropped onto a substrate.
Figure 11:
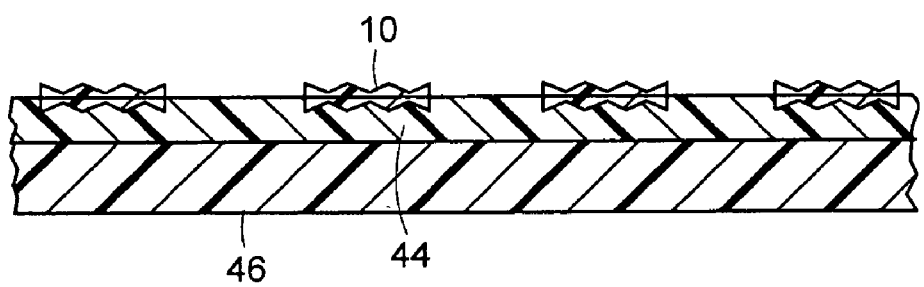
FIG. 11 illustrates the two-sided optical components partially embedded into the substrate.
Figure 12:
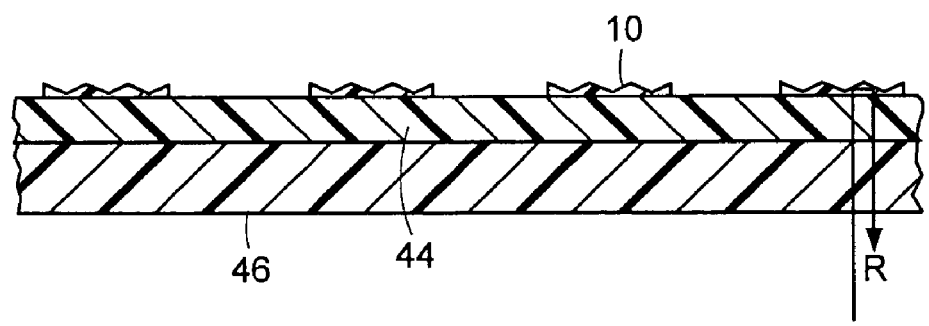
FIG. 12 illustrates the embedded side of the components of FIG. 11 being substantially wetted-out.

FIGS. 10-12 illustrate another embodiment of the invention in which components 10 are dropped onto a substrate 44, such as a liquid-curable coating or adhesive. The sides of the components 10 that contact the coating 44 are wetted-out as shown in FIG. 11. Some air pressure, mechanical, or other methods can be used as necessary to push the components 10 into the coating 44 if the coating surface tension prevents the prism peaks from penetrating the coating. A substantially transparent top film 46 can be provided on the coating 44 as shown. The coating 44 is then cured, for example, with heat or ultraviolet radiation to create a solid but flexible product.

If the index of refraction is substantially the same between the prism material and the coating 44, no boundaries are present and there is no Fresnel reflection or scattering losses at these interfaces as illustrated in FIG. 12.

Figure 13:
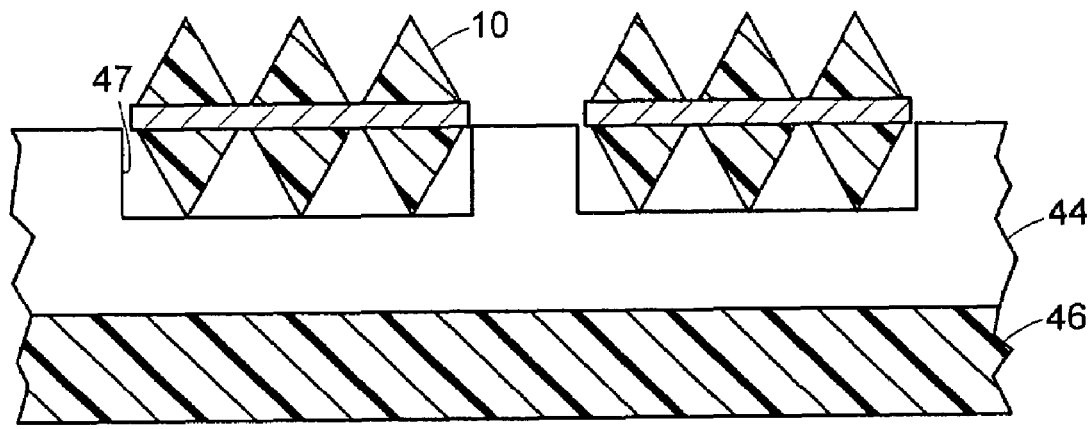
FIG. 13 is a sectional view of two-sided optical components positioned within cells formed in a substrate.
Figure 14:
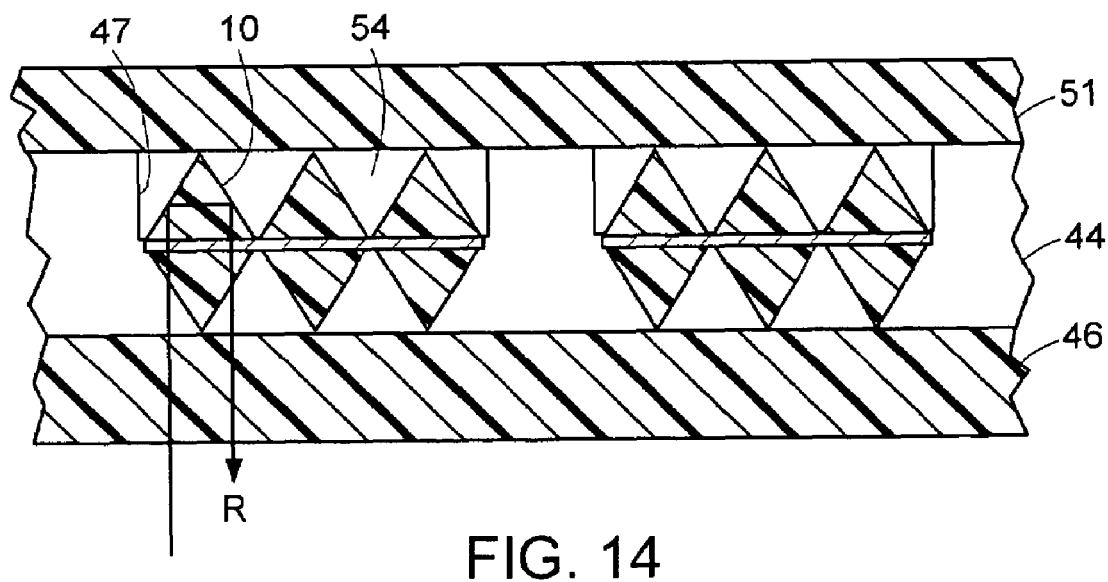
FIG. 14 is a sectional view of the embodiment of FIG. 13 with a backing layer laminated to the substrate.

FIGS. 13 and 14 illustrate an embodiment of placing the components 10 on the substrate 44 in a desired location or pattern. Substrate 44, that can include a transparent heat-activated adhesive, is applied to the top film 46 in a pattern that creates cells 47 that have adhesive in the bottom. The components 10 fall into the cells 47 and a backing layer 51 can be laminated to push the components into the adhesive.

In further embodiments, the components 10 can be positioned on a substrate in a pattern using techniques as described in an article entitled "Self-Assembly Required," by Ron Dagani, in *Chemical & Engineering News*, p. 13 (Apr. 15, 2002), the teachings of which are incorporated herein by reference.

In any of the embodiments disclosed herein, wide area sheets can be formed having at least one side having a plurality of microstructures. The sheets can be mechanically cut, laser cut, or formed into threads. In one embodiment, the threads are about 0.3048 micrometers (0.012 mils) wide. The threads can be chopped into lengths of about 2.54 micrometers (0.1 mils). The threads and components can be formed into any geometric shape such as square, rectangular, diamond-shape, etc.

In other embodiments, a security film original document can be manufactured that has at least one message or design such as a watermark printed in transparent ink. The transparent ink wets-out to show the message. A copy or duplicate of the document cannot be easily made unless one has access to the film and printing system.

Also, in any of the embodiments, the thickness of substrates 28, 44 can be optimized to be equal to the prism depth so that the components do not submerge in the substrate, thereby wetting-out only one side.

Figure 15:
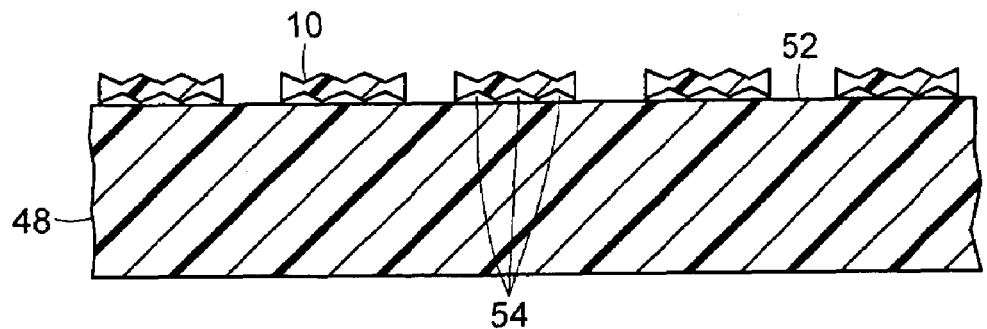
FIG. 15 is a sectional view of a plurality of two-sided optical components being supported on a substrate.
Figure 16:
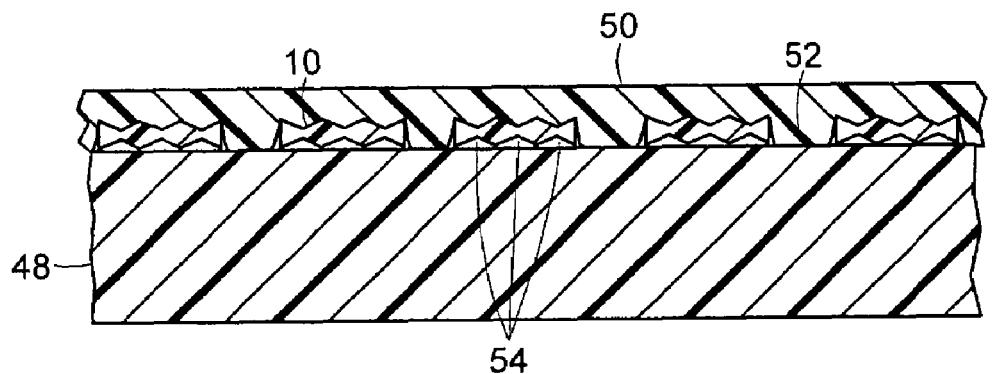
FIG. 16 illustrates a fill layer being disposed over the two-sided optical components of FIG. 15 to bond the components to the substrate.
Figure 17:
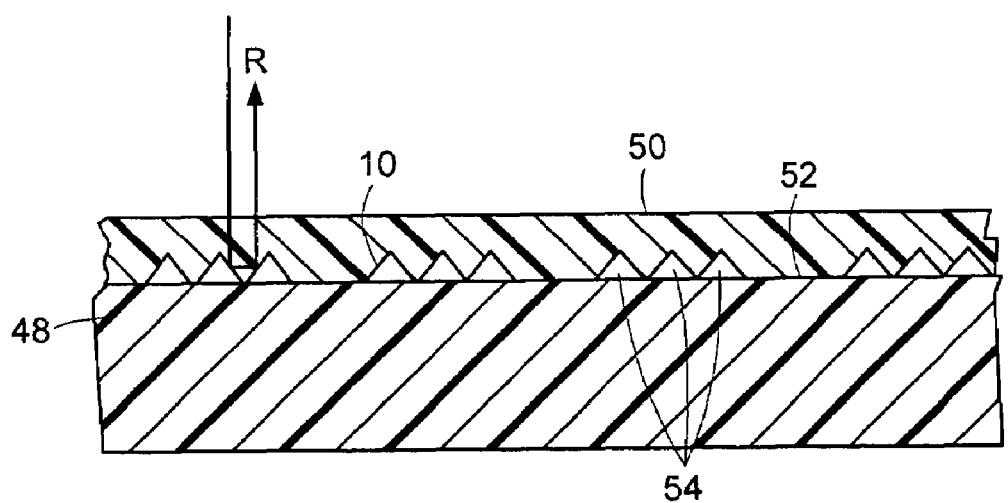
FIG. 17 is a sectional view of the resulting optical structure formed in FIGS. 15 and 16 when the index of refraction of the fill layer and underlying substrate are substantially the same.

FIGS. 15-17 illustrate another embodiment of the invention. In a particular embodiment, a substrate or carrier 48 supports a plurality of components 10. The substrate 48 can include fabrics, clothing, and the like. To form the two-sided components 10, the bases of two cube-corner sheetings are attached, for example, to a transparent film or substrate 12. The facets from each sheeting thus extend away from the transparent film. In other embodiments, the bases can be directly attached to one another such that they are formed without substrate 12. The two-sided structure is then formed into components 10.

In one embodiment, the components 10 are positioned, for example, randomly, on the substrate 48 and lie substantially flat. A fill layer 50 covers the components 10 and bonds them to the substrate 48, for example, at area 52 between components. The fill layer 50 has a sufficiently high viscosity, such as about 30,000 to 50,000 centipoises, such that it does not flow underneath the components 10 to provide air pockets 54 under substantially all of the components 10. Thus, the components 10 are wetted-out on top by the fill layer 50 such that light incident on the top of each component 10 passes through. Some pressure can be used to ensure substantially uniform wetting. The air pockets 54 provide an "air backed" component 10 such that light passing through the top of the component 10 is retroreflected by the air-backed facets. The light retroreflected from the air-backed facets has a white appearance, which can be preferred in some applications.

Figure 18:
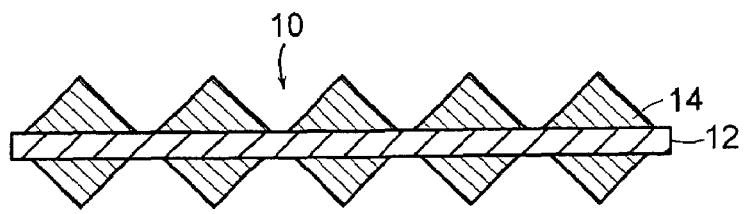
FIG. 18 is a sectional view of a two-sided optical component.
Figure 19:
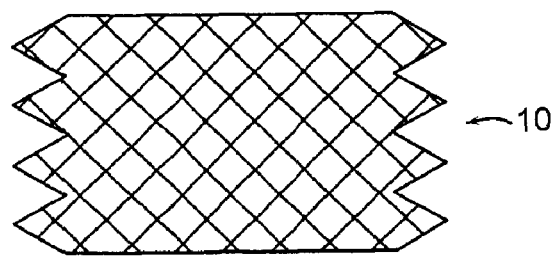
FIG. 19 is a top view of the component illustrated in FIG. 18.

FIGS. 18 and 19 illustrate a component 10 that is made with barbs cut into the edges that can grab into woven and non-woven fabrics and papers.

Figure 20:
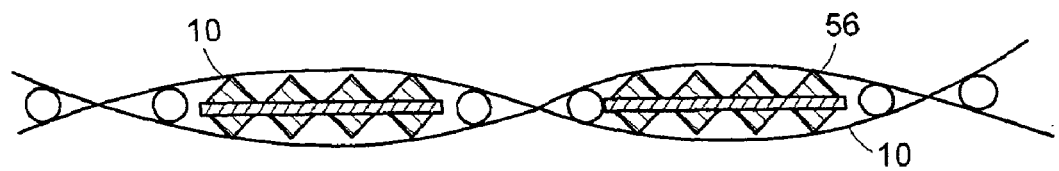
FIG. 20 illustrates the optical component shown in FIGS. 18 and 19 pressed in a fabric.
Figure 21:
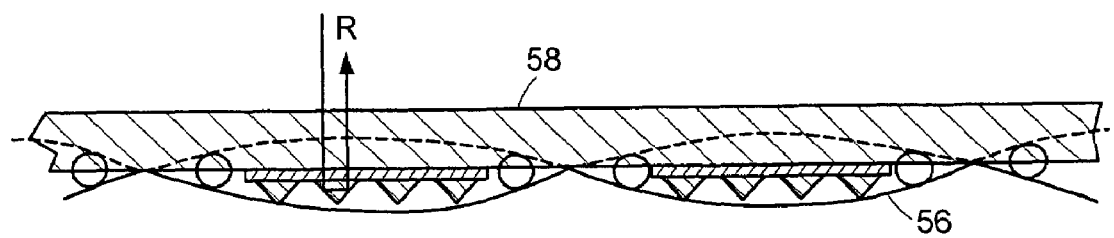
FIG. 21 illustrates the fabric shown in FIG. 20 with a coating thereon.

FIG. 20 illustrates the components 10 pressed in a fabric 56 and held in place by the barbs. As illustrated in FIG. 21, a coating 58 can be provided on a side of the components 10 to produce a garment that retroreflects light ray R, as shown. This product configuration can now be bonded onto a substrate by fasteners, such as sewing or rivets or by adhesives or by heat, radio frequency, ultrasonic, or other suitable sealing means. Many types of substrates, which can range from fabrics to polymers to metal to ceramic, can be used depending on the application. The product configuration can be made into garments, such as raincoats, which may have an inner liner to protect the exposed prism tips.

Figure 22:
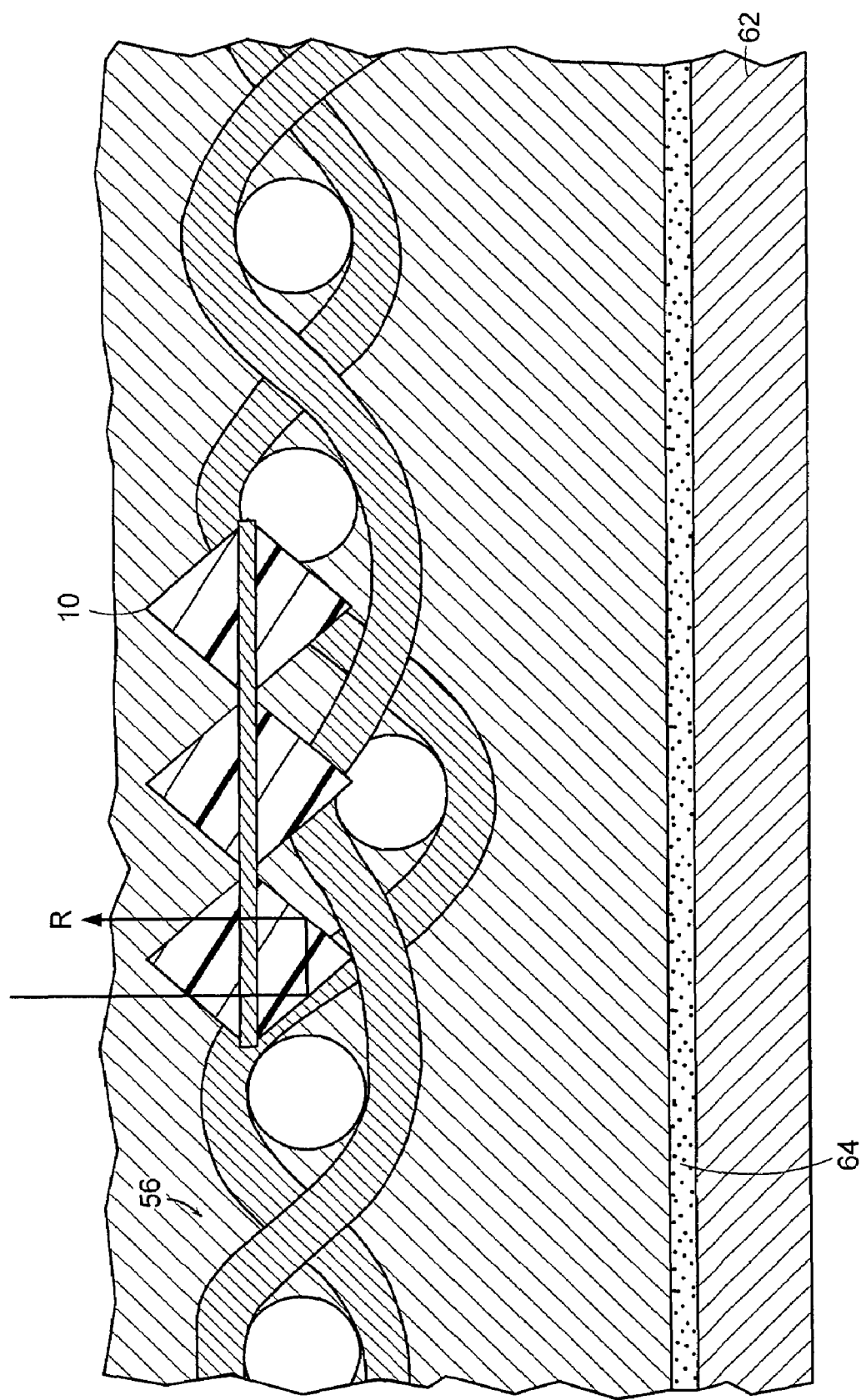
FIG. 22 is an embodiment of a two-sided optical component embedded within a layer of fabric.
Figure 23:
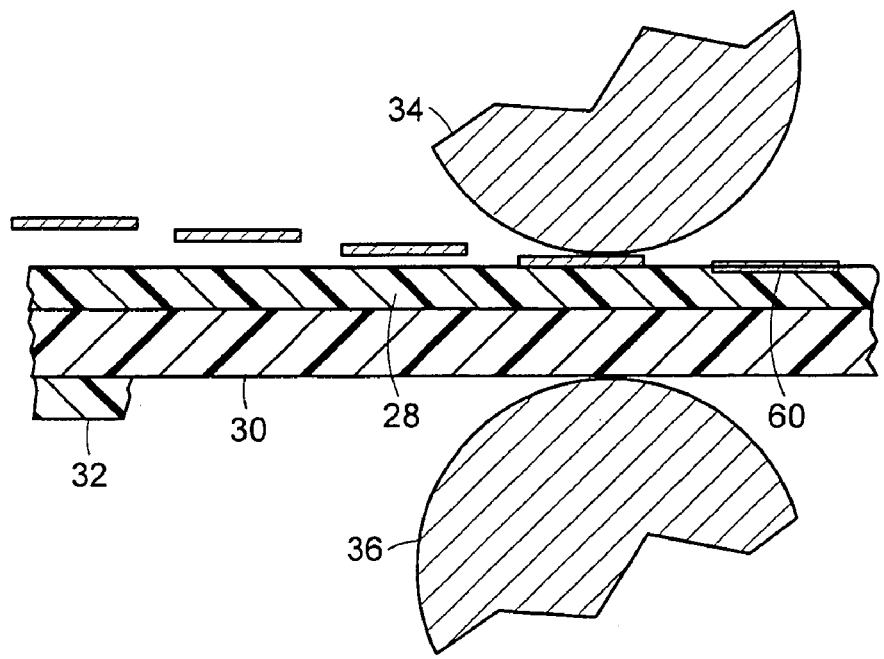
FIG. 23 illustrates one embodiment of embedding a two-sided optical component in a substrate.

Two-sided, open-faced components or anti cube-corners, such as disclosed in U.S. application Ser. No. 09/488,129, filed Jan. 20, 2000, and International Publication WO 00/43813, published on Jul. 27, 2000, the entire teachings of which are incorporated herein by reference, can be used in high temperature applications. FIG. 22 illustrates an embodiment of a component 10 embedded within a layer of fabric 56, which can include fluorescent material. A substantially transparent top coat 58 is provided on the fabric 56. In any of the embodiments disclosed herein, an outer or top coat that can be provided on the optical structures or components includes pillory or other suitable material that is substantially transparent and hard as formed. Fabric 56 can be attached to a substrate 62, which can be opaque and/or fluorescent, with an adhesive 64. The use of opaque fluorescent fabrics, adhesive, and substrate material allows the production of a long lasting material, which can be used in outdoor applications. The random orientation of the components 10 can produce a glitter effect that is increased when the top prisms are not completely wetted-out.

In any of the embodiments disclosed herein, the components 10 can be made from many different materials, such as luminescent, colored, diffractive, etc. Many different types of flakes can be mixed together to form many interesting appearances and functional effects.

FIGS. 23-30 illustrate various embodiments in which the component 10 includes moth-eye structures, diffusers, or other optical microstructures on both sides.

The components 10 can be partially embedded into an adhesive 28 with rolls 34, 36. Partially embedded components 60 are thus provided in which one side is substantially wetted-out.

Figure 24:
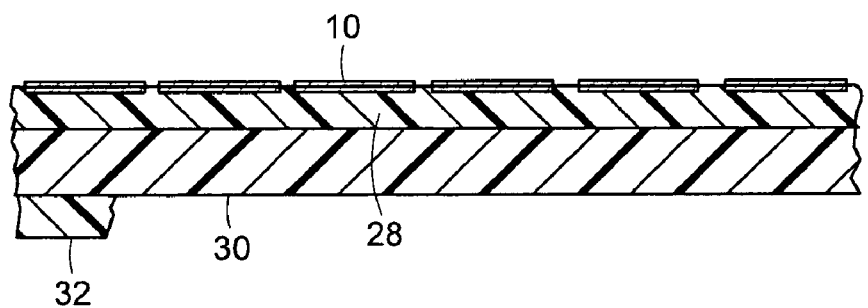
FIG. 24 illustrates the components shown in FIG. 23 partially embedded to wet-out one side of the components.
Figure 25:
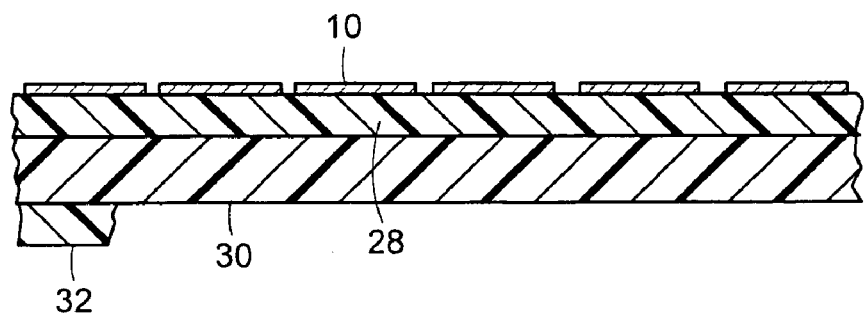
FIG. 25 illustrates the resulting optical structure of FIGS. 23 and 24 when the index of refraction of the components and the substrate is substantially the same.

The resulting structure is shown in FIGS. 24 and 25. The adhesive 28 can have the same index of refraction as the material that forms the moth-eye or diffuser microstructures (resulting in the structure shown in FIG. 25) unless some additional light redirection is desired. In a particular embodiment, approximately ninety percent of the surface has moth-eye or diffuser optical microstructures. Thus, the surface becomes anti-reflective when moth-eye components are used and diffuse when diffuser components are used.

Figure 26:
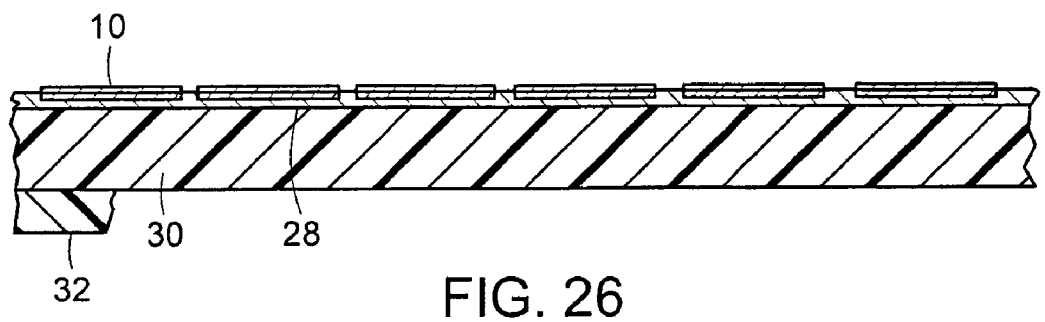
FIG. 26 illustrates two-sided optical components partially embedded in adhesive.
Figure 27:
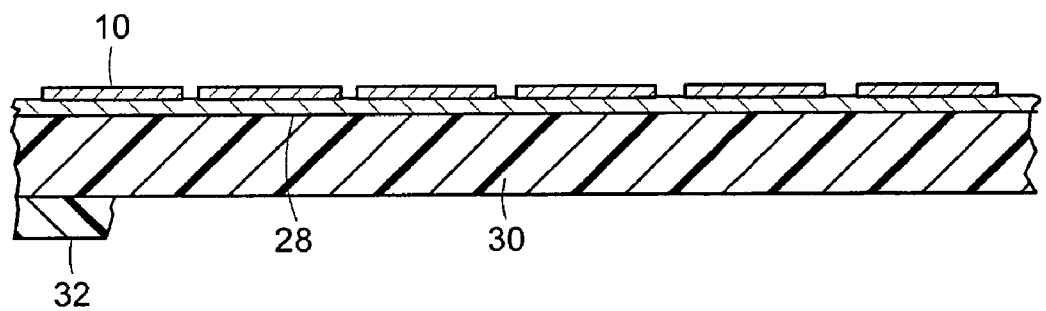
FIG. 27 illustrates the resulting optical structure of FIG. 26 when the index of refraction of the components and the adhesive is substantially the same.

As shown in FIG. 26, the components 10 can be dropped onto a liquid coating or adhesive 28 and allowed to wet to the coating on the side of the component 10 that comes into contact with the coating. Air pressure or other methods can be used to push the component into the coating if the coating surface tension prevents the component from wetting-out on one side. Again, the thickness of coating 28 can be made to a depth such that the component cannot submerge deep enough to cover the non-wetted-out side. The wetted-out side of the components 10 contacts substrate 30 to prevent the components from being submerged in the coating 28. The coating 28 can have the same index of refraction as the material that forms the moth-eye or diffuser microstructures (resulting in the structure shown in FIG. 27) unless some additional light redirection is desired. In a particular embodiment, approximately ninety percent of the surface has moth-eye or diffuser optical microstructures.

Figure 28:
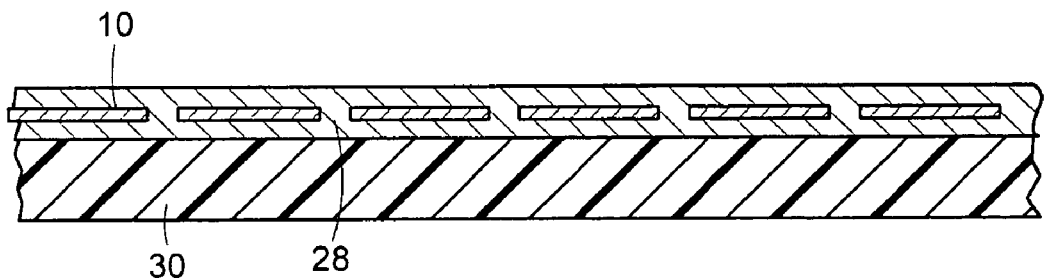
FIG. 28 is a sectional view of two-sided optical components embedded within a substrate.

In other embodiments, the components 10 can be dropped or mixed into a liquid coating 28 and the components are allowed to wet to the coating on both sides. The resulting structure is shown in FIG. 28. In the case of two-sided surface relief diffuser components that are made from a material that has an index of refraction significantly different than the coating or adhesive, the components can be submerged in the coating or adhesive 28. An index difference achieved by having a silicone-based adhesive with n=1.35 and a component with n=1.58 is an example of a product that works well as a bulk surface relief diffuser.

Figure 29:
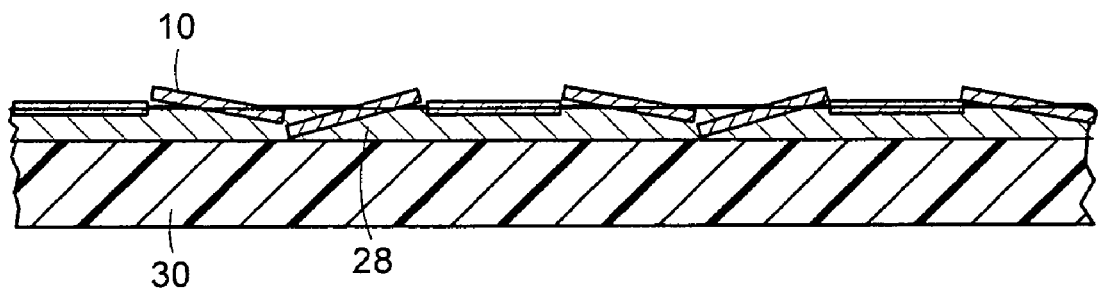
FIG. 29 is a sectional view illustrating two-sided optical components partially embedded within a substrate.

FIG. 29 illustrates components 10 wetted-out with coating 28 cured. As before, the coating 28 can be sufficiently thin so that the components 10 cannot submerge enough to wet-out both sides. With the longitudinal axis of the components 10 non-parallel to the surface of the coating 28, additional anti-glare or diffuser functions are provided. In other embodiments, the substrate surface 28 can be made non-flat to enhance the anti-glare or diffuser functions.

Figure 30:
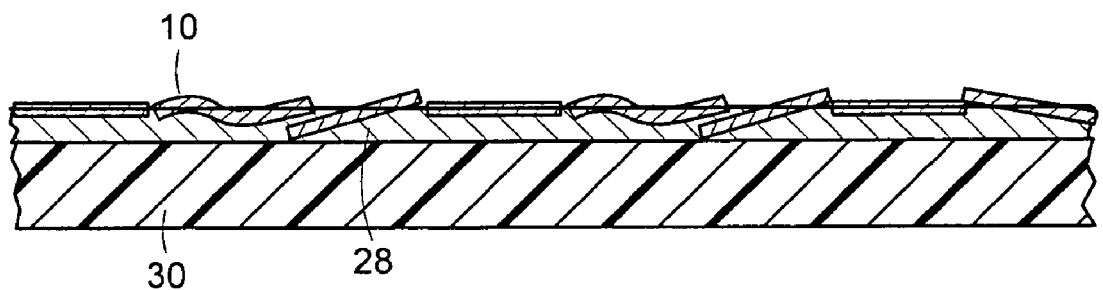
FIG. 30 illustrates non-planar two-sided optical components partially embedded within a substrate.

As shown in FIG. 30, the components 10 can be non-planar to provide additional anti-glare or diffuser functions.

In some applications, it may be desirable to register or locate the components 10 in a desired pattern on the substrate. The components 10 can have any geometric shape, including circular, hexagonal, triangular, and rectangular shapes. In one embodiment, the components are 0.1016 mm (0.004 inch) thick, 0.508 mm (0.020 inch) long, and 0.508 mm (0.020 inch) wide.

In a particular embodiment, a perforated film is used as the template. The film can be about 0.1016 mm (0.004 inch) thick and have holes slightly larger than the longest dimension of the component. Only one component at a time is able to fit into the perforated hole. An uncured, clear coating or an optical grade clear adhesive is disposed on a substantially clear substrate. The template is then placed on the coating or adhesive. The components 10 are then placed in the holes of the template, with one component in each hole. In one embodiment, the components are vibrated to facilitate the placement of one component in each hole. Pressure can be used to ensure the components are pressed into the adhesive. The extra components can be removed, for example, with a vacuum, for re-use. If necessary, the components can be pressed farther into the adhesive. The perforated template is then removed and the coating or adhesive can be cured, if necessary.

Figure 31:
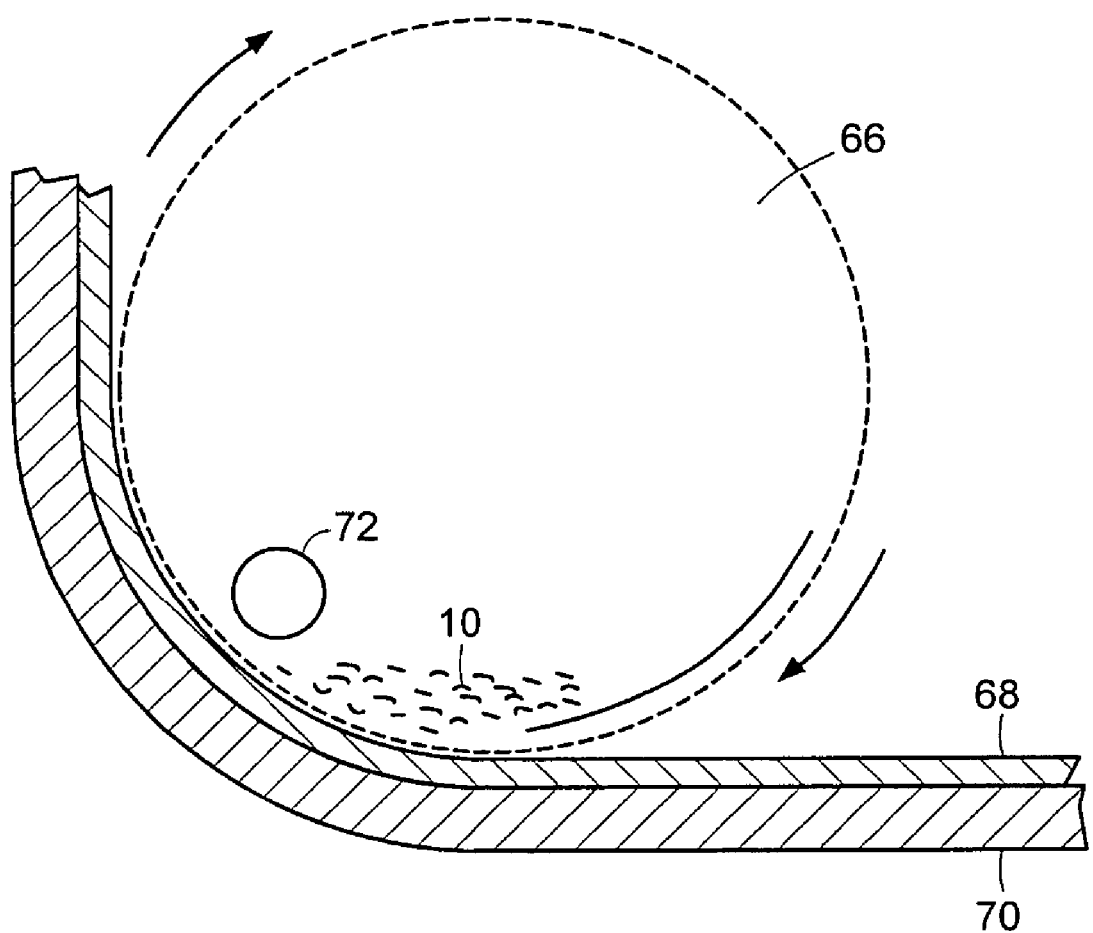
FIG. 31 is a schematic of an apparatus used to locate two-sided optical components on a substrate.

In one embodiment, with reference to FIG. 31, the perforated template can be in the form of a rotary screen 66 with the proper size holes and hole spacing. The screen 66 can be vibrated to assist the flow of the components 10 into the holes in the screen 66.

Only one component 10 can locate in each hole and bond to the clear coated clear film or clear adhesive 68 on the clear substrate or film 70. The substrate 70 and adhesive 68 wrap around the screen 66 such that extra components 10 fall back to the bottom, and located components 10 can be pushed or pressed into place, for example, with a roller 72. The outer surface of the screen 66 can be covered with, or formed from a material, such as a silicone release or other suitable material, such that the adhesive 68 does not stick to it. Rotary screens 66 can be obtained from Stork NV, Naarden, The Netherlands.

Figure 32:
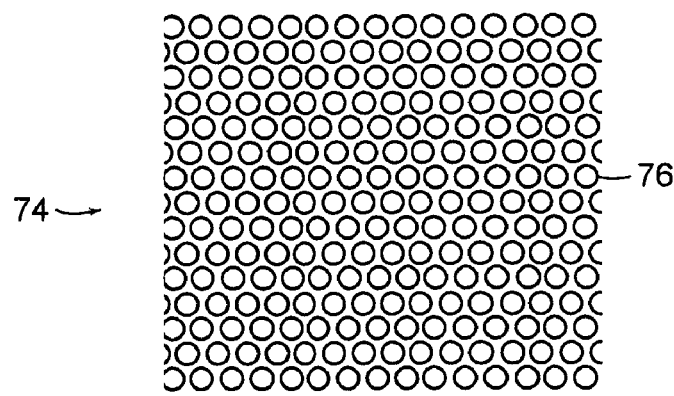
FIG. 32 is a top view of a honeycomb structure used to locate two-sided optical components on a substrate.

An optical structure has been made using a honeycomb structure manufactured by Plascore, Inc. of 615 N. Fairview Street, Zeeland, Mich. 49464, part number PCFR125-W. The particular honeycomb structure 74 used is one inch deep with an opening size of about 3.175 mm (0.125 inch). The structure has regularly spaced openings 76 as shown in FIG. 32.

Figure 33:
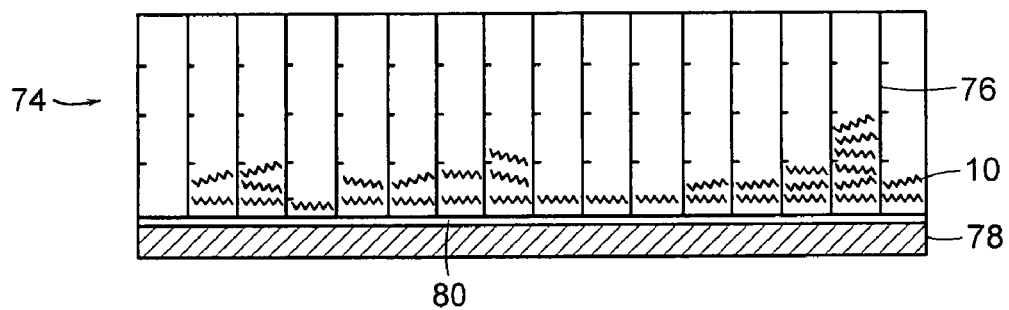
FIG. 33 is a sectional view of a honeycomb structure positioned on a substrate with two-sided optical components disposed within the honeycomb structure.

A film 78, which can be polyethylene terephthalate (PET), is coated with about a 0.0508 mm (0.002 inch) thick coating of clear acrylic resin or adhesive 80. The honeycomb 74 is placed on the coated surface 80, displacing the coating 80 where the honeycomb structure 74 pushes down on the film 78. Hexagonal, two-sided components 10 are sprinkled on top of the honeycomb structure 70 (FIG. 33). The components 10 are slightly less than or equal to the 0.0508 mm (0.002 inch) openings when measured across a diagonal of the hexagon-shaped component 10.

Figure 34:
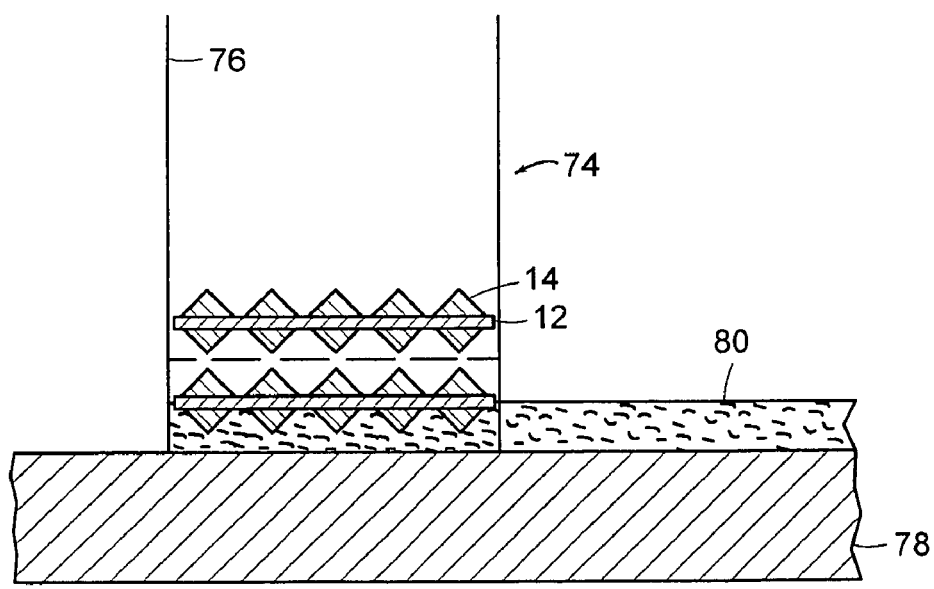
FIG. 34 is an enlarged view of two-sided optical components within the honeycomb structure of FIG. 33.

In this embodiment, the components 10 have cube-corner prisms 14 having a 0.1524 mm (0.006 inch) pitch on both sides of a 0.0508 mm (0.006 inch) PET film 12 with the cube-corner face bonded to the film. The size of the component 10 relative to the opening 76 of the honeycomb structure 74 allows only one component 10 to settle in a flat position on the adhesive 80 (see enlarged view in FIG. 34). In one embodiment, the coating 80 is substantially transparent or clear with the same index of refraction as the cube-corner prisms 14 causing the bottom prisms of the component 10 to wet-out and thus effectively disappear. A small amount of air pressure can be applied to assure that the bottom prisms 14 of the components 10 thoroughly penetrate the adhesive 80. The coating 80 is then cured either through film 78 or through the honeycomb structure 74.

Figure 35:
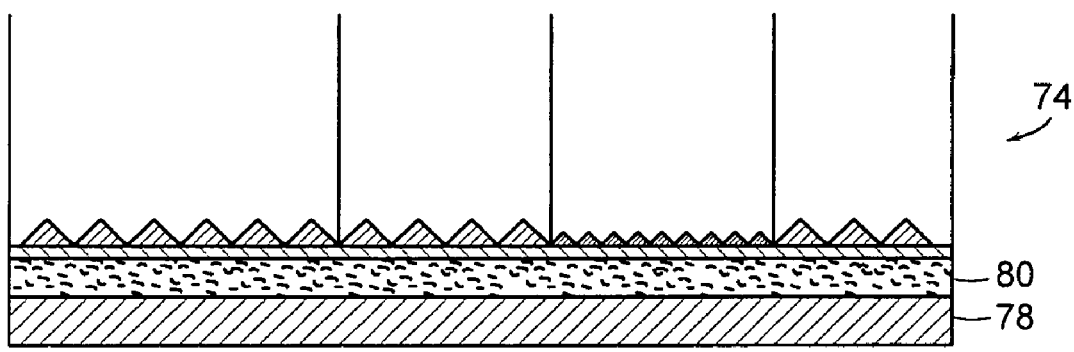
FIG. 35 is similar to FIG. 33 but having the excess two-sided optical components removed from the honeycomb structure.
Figure 36:
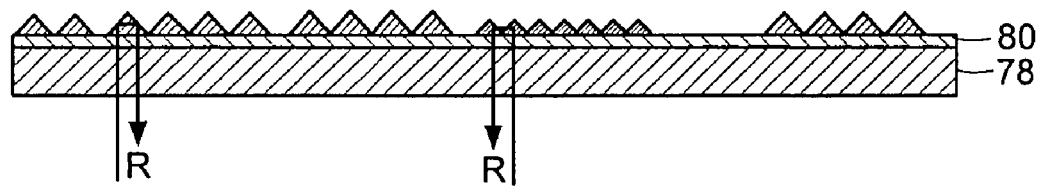
FIG. 36 is a sectional view of the resulting optical structure formed from the embodiment shown in FIGS. 33-35.

The extra components 10 can be removed, for example, with a vacuum, and recycled for later use, leaving the structure shown in FIG. 35. The finished optical structure (FIG. 36) can have components 10 having the same or different size cube-corner prisms. Some of the honeycomb holes 76 can be blocked as one size prism is located and then opened to allow filling the empty honeycomb holes with a different size prism on the components 10.

Although this example uses components having cube-corner prisms, components having moth-eye structures, linear prisms, lenslets, surface relief structures, micro-lens structures, fish-eye lens arrays, and other suitable optical structures can be implemented as well.

Figure 37:
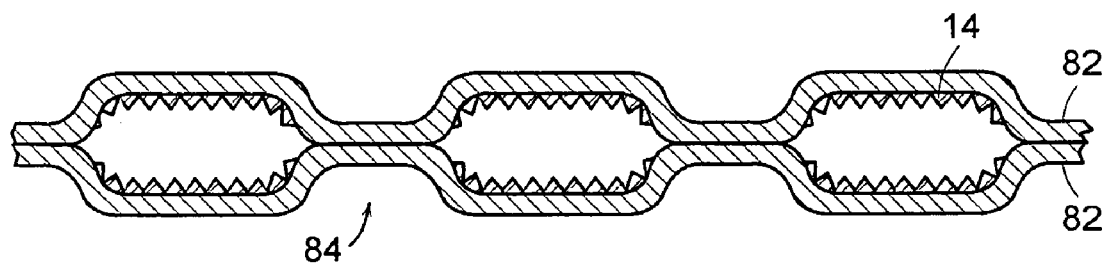
FIG. 37 is a sectional view of another embodiment of an optical structure used to form two-sided optical components.
Figure 38:
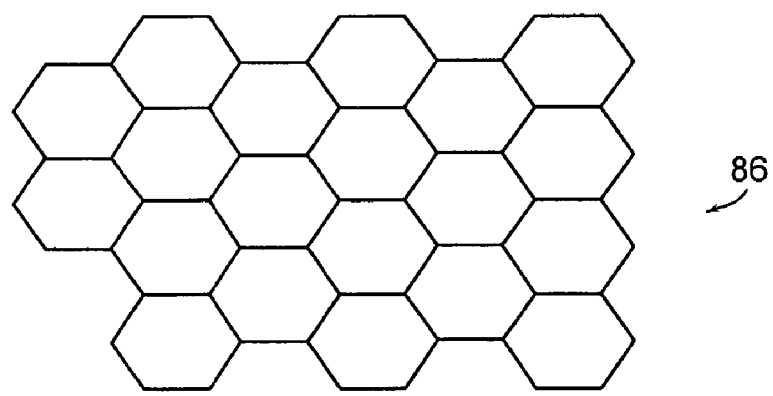
FIG. 38 illustrates a pattern used to seal the optical structure shown in FIG. 37.

In particular embodiments, air-backed, two-sided components can be made by sealing two sheets together, each sheet having optical microstructures on one side, and breaking sealed-encapsulated cells into separate air-backed components. In a particular embodiment, as illustrated in FIG. 37, sheets 82, which can be thermoplastic and have optical microstructures on at least one side, in this case cube-corner prisms 14, are sealed at selected areas 84 or patterns 86 (FIG. 38). In other embodiments, a single sheet 82 can be folded over on itself to form the optical structure. The sealed areas 84 are designed to tear or break easily. The prisms 14 in the sealed areas 84 are forced into the thermoplastic sheet 82 to allow bonding of the two sheets 82 to encapsulate the prisms. The thermoplastic sheets 82 can be soft or rigid, depending on the desired properties of the encapsulated components.

The resulting components can be spread on an adhesive coated film, mixed into adhesives, polymers, paints, coatings, etc. In a particular embodiment, any of the components disclosed herein can be dispersed in polyurea, which is disclosed in U.S. patent application Ser. No. 10/634,122, filed Aug. 4, 2003, the entire teachings of which are incorporated herein by reference. Multiple size and tilt of the optical microstructures, for example, cube-corner prisms, can be used. If desired, at least some of the prisms can be metalized. Different size components can also be used, if desired. Additionally, open-faced components or anti-cube-corner components can be used to form the components disclosed herein.

Figure 39:
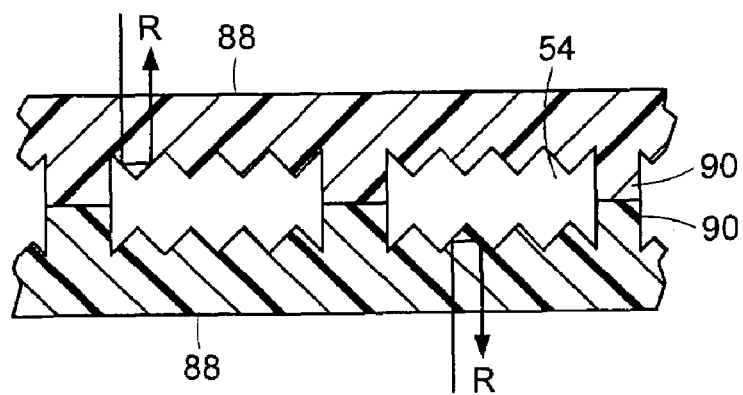
FIG. 39 is a sectional view of another embodiment of a two-sided optical component.
Figure 40:
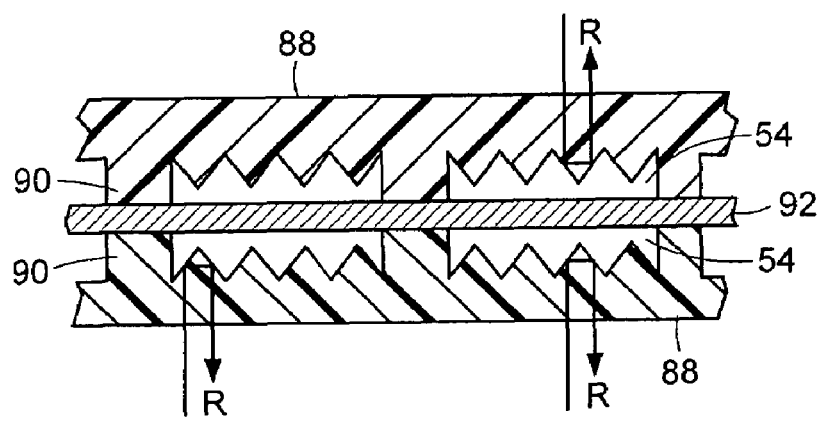
FIG. 40 is similar to the embodiment shown in FIG. 39 but having a layer disposed in the middle.
Figure 41:
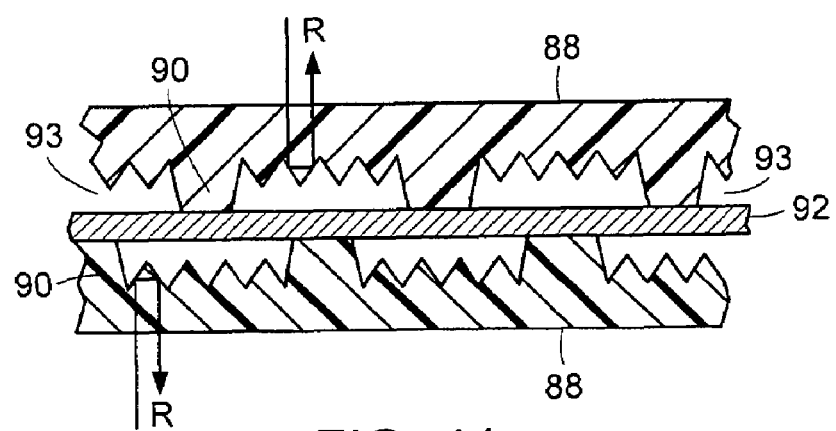
FIG. 41 is similar to the embodiment of FIG. 40 but not having extending members registered on the middle layer with respect to one another.

Another embodiment of a two-sided optical structure is shown in FIG. 39, in which two sheets 88 having optical microstructures on at least one side are registered back to back and held together at extending members 90, for example, with adhesive. As illustrated in FIG. 40, a middle layer 92, which can be colored or white, can be provided between the sheets 88. As illustrated in FIG. 41, extending members 90 do not have to be registered with respect to one another on layer 92. If the optical structure of FIG. 41 is mixed into a liquid, such as paint, there may be some loss of retroreflection at areas 93 because the liquid may wet-out the optical microstructure, such as cube-corner prisms.

Figure 42:
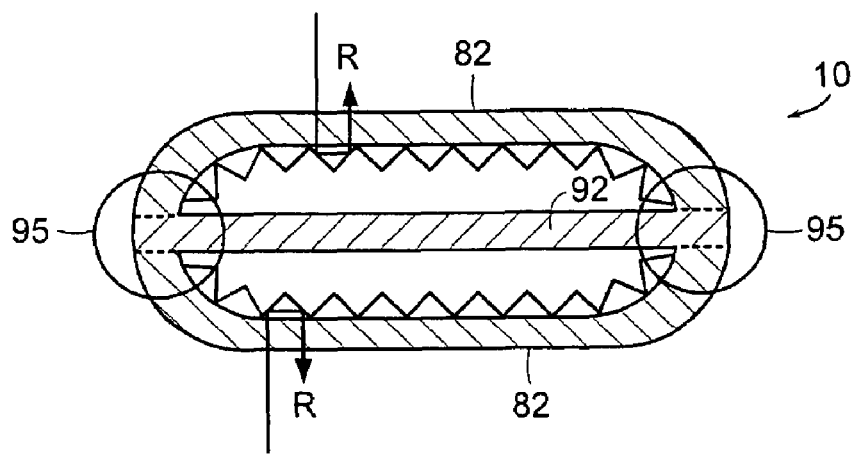
FIG. 42 is a sectional view of a further embodiment of a two-sided optical component.

FIG. 42 illustrates one embodiment of a two-sided optical component 10 in which sheets 82 are positioned such that the optical microstructure faces sheet 92, which can be colored or white. At areas 95, the sheets are sealed together and sheared off to form components 10.

The resulting structures can be cut or formed into individual components that can, for example, be mixed into a viscous fluid or floated onto a substrate.

Figure 43:
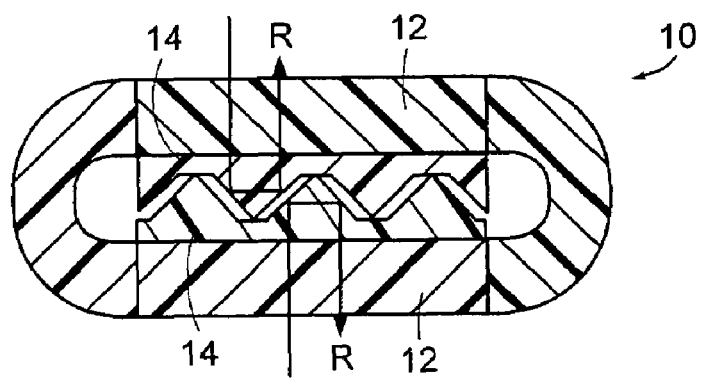
FIG. 43 is a sectional view of another embodiment of a two-sided optical component.
Figure 44:
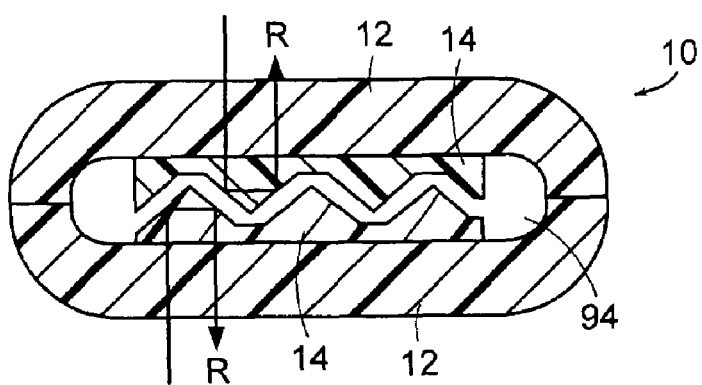
FIG. 44 is a sectional view of yet another embodiment of a two-sided optical component.

FIG. 43 illustrates yet another embodiment of a two-sided component 10. Two sheets or top film 12 having optical microstructures, such as cube-corner prisms 14, on at least one side, are made to allow flow sealing around the edges of the back-to-back cube-corners as the material is cut to form the sealed components. As shown in FIG. 44, the top film material is flowed around the back-to-back air-backed cube-corner sections as the films are cut into components forming encapsulated back-to-back air-backed cube-corner sections that retroreflected in two opposite planes. Area 94 can also be filled in with top film material.

Figure 45:
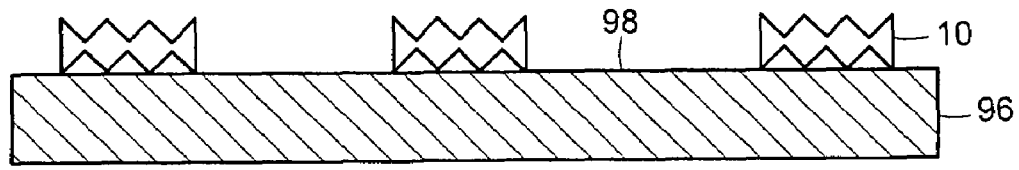
FIG. 45 is a sectional view of a plurality of two-sided optical components disposed on a substrate.
Figure 46:
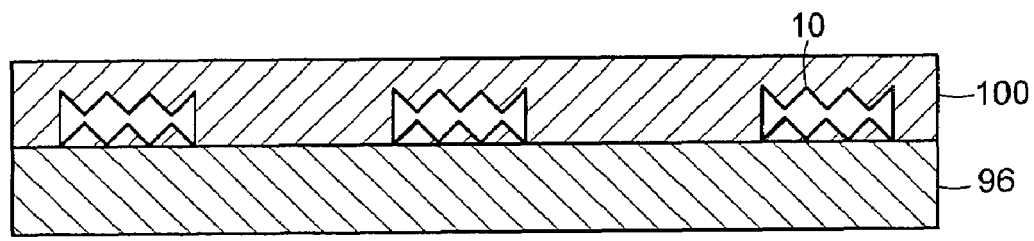
FIG. 46 is similar to FIG. 45 but having a fill layer disposed over the two-sided optical components.
Figure 47:
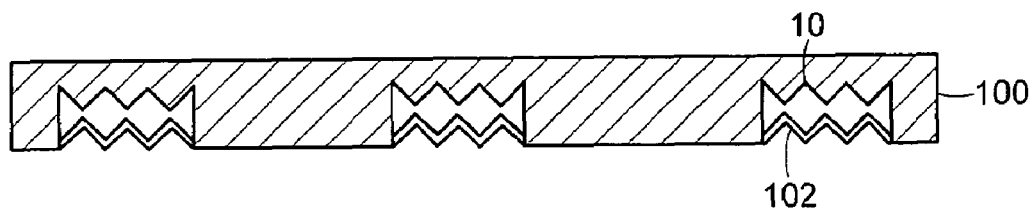
FIG. 47 is a sectional view of the optical structure shown in FIG. 46 with the substrate removed and the two-sided optical components being metalized on one side.
Figure 48:
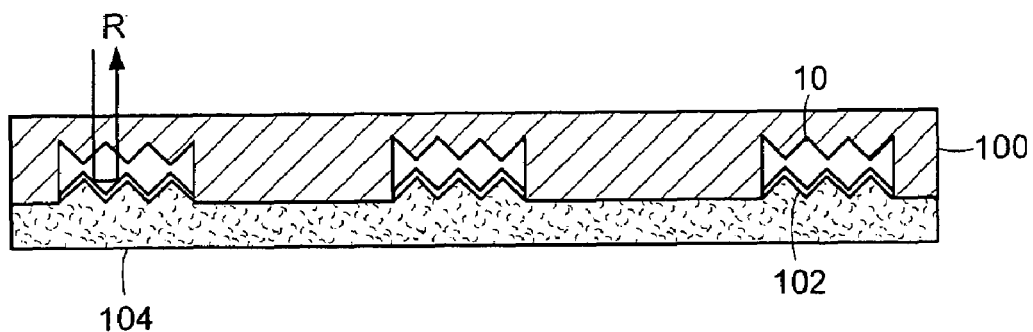
FIG. 48 is similar to FIG. 47 but having the adhesive disposed over the metalized side of the two-sided optical components.

FIGS. 45-48 illustrate another embodiment of the invention. In this embodiment, as shown in FIG. 45, a plurality of two-sided retroreflective cube-corner components 10 are positioned on a substrate 96. A light tack adhesive 98 can be used to hold the components 10 in place. A fill layer 100 is then formed over the components 10 as shown in FIG. 46. In FIG. 47, the substrate 96 has been stripped away to expose one side of substantially all of the components 10. A reflective coating 102, for example, a metal layer of aluminum, is formed on the exposed facets of the components 10. In other embodiments, the reflective coating covers the entire bottom surface. In FIG. 48, a layer of adhesive 104 can be formed on the fill layer 100 adjacent the reflective coating 102 such that the structure can be attached to a substrate, for example, an article of clothing.

Figure 49:
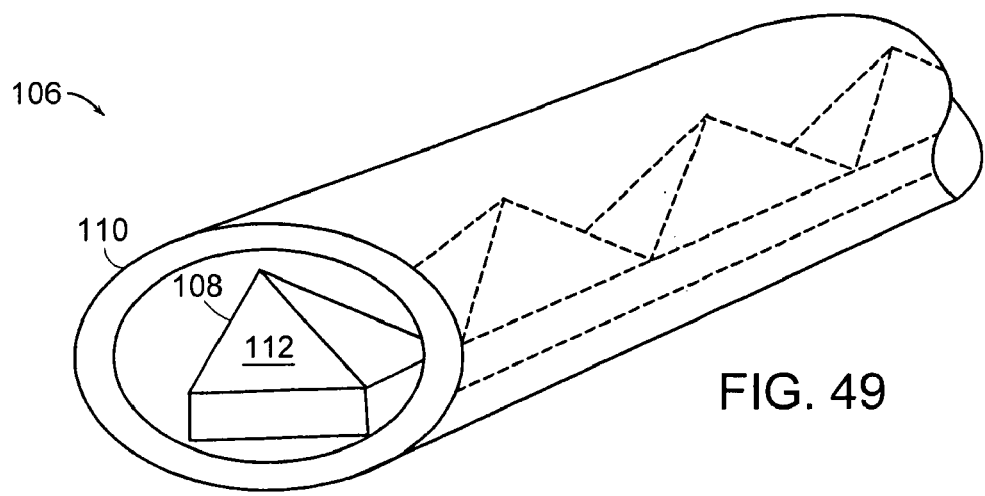
FIG. 49 is a perspective view of a retroreflective thread in accordance with an embodiment of the present invention.

In other embodiments, an elongate optical structure that can be called a thread or fiber 106 is provided having microstructures 108, such as cube-corner prisms, surface relief diffuser structures, micro-lens structures, or other microstructures, as disclosed above, or combinations thereof. A tube or outer layer 110 surrounds or encases the prisms 108 to protect and, in specific embodiments, insure that facets 112 are air-backed. The outer layer 110 can be formed from a material that is sufficiently flexible to be stitchable into a garment while having sufficient tensile strength such that it does not break during the stitching process. In particular embodiments, the outer layer 110 can be formed from polyester, nylon, polyvinyl chloride (PVC), or other suitable materials or combinations thereof. In a particular method of manufacture illustrated in FIG. 49, microstructures 108 are slit cast or molded into thin threads and the outer layer 110 is extruded around the microstructures, e.g., the microstructures are fed inside the outer layer as it is extruded. The thread 106 can be cut or formed into discrete lengths to form chips or flakes that can be woven in a fabric mesh, mixed in with a coating, applied to a film, or used in other suitable applications. The ends of the chips with flakes can be sealed.

Figure 50:
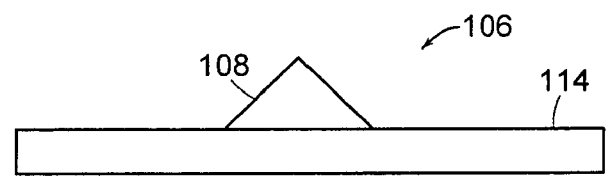
FIG. 50 is a side view of a row of microstructures positioned on a substrate.
Figure 51:
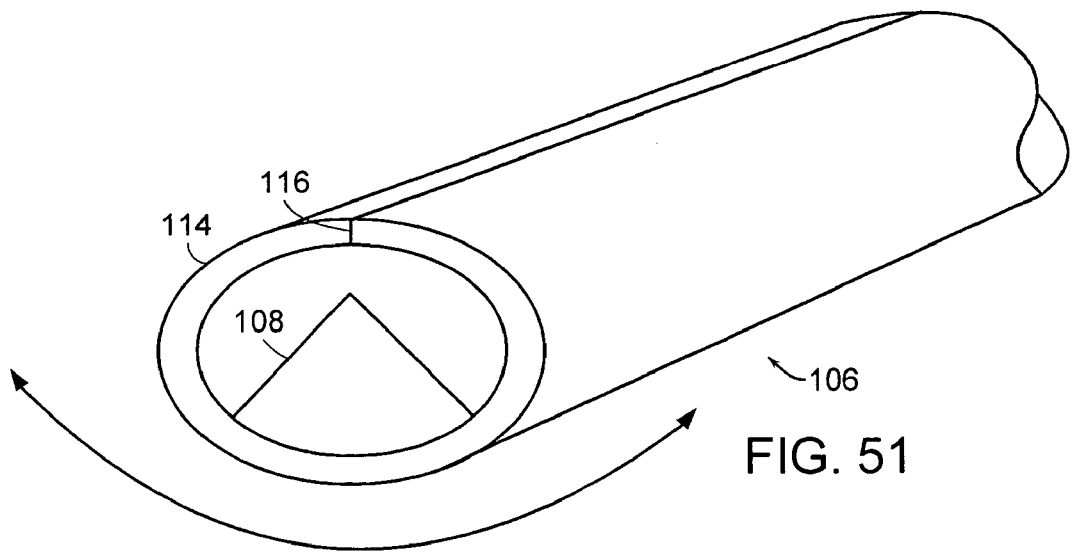
FIG. 51 is a perspective view of the substrate of FIG. 50 formed into a retroreflective thread enclosing the microstructures therein.
Figure 52:
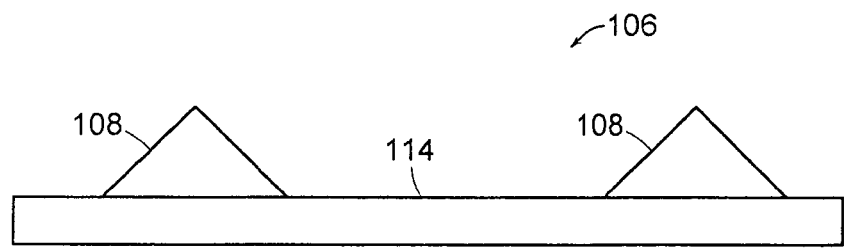
FIG. 52 is a side view of two rows of microstructures positioned on a substrate.
Figure 53:
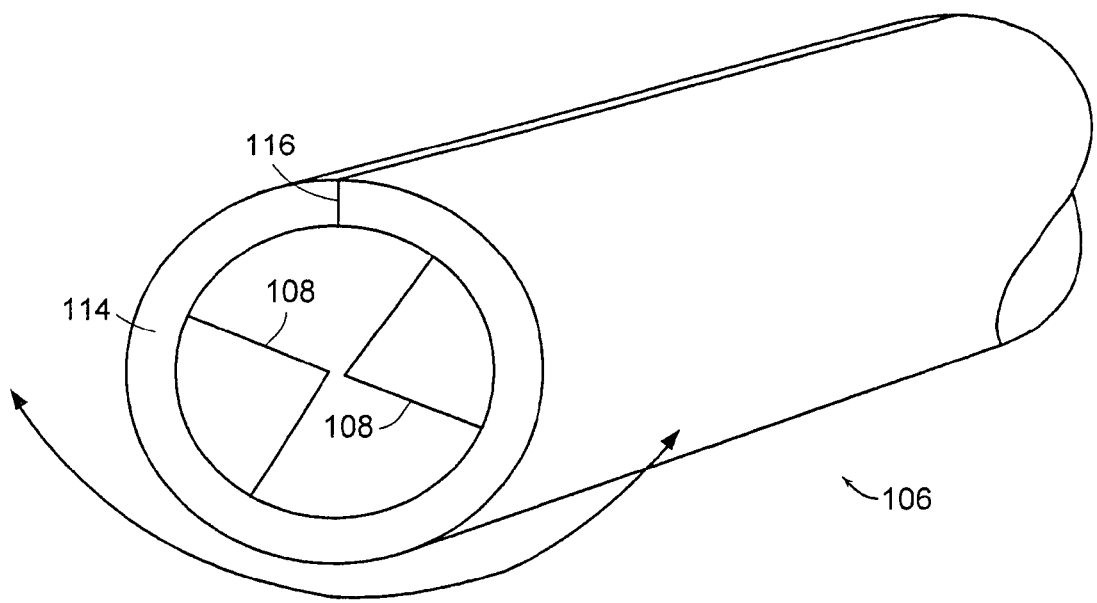
FIG. 53 is a perspective view of the substrate of FIG. 52 formed into a retroreflective optical structure enclosing the microstructures therein.

FIGS. 50 and 51 illustrate another embodiment of a thread 106 in which the microstructures 108 are provided on a substrate 114, such as by a slit casting method. The substrate 114 is then wrapped around the microstructures 108 to become the outer layer of the thread 106 and sealed at area 116. The cross-sectional shape of the thread 106 can be any geometric shape. In a particular embodiment, the thread 106 is substantially circular in cross-section, having an outside diameter in the range of between about 50 and 510 micrometers (0.002 and 0.020 inches). FIGS. 52 and 53 illustrate an embodiment of a retroreflective thread 106 configured to retroreflect light in at least two directions. Thus, a single substrate 114 forms the outer layer.

Figure 54:
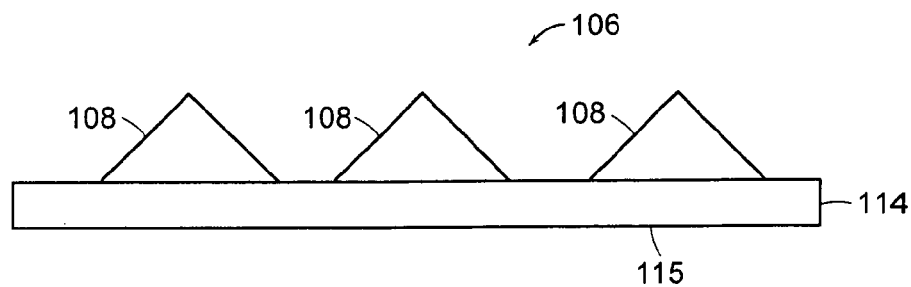
FIG. 54 is a side view of three rows of microstructures positioned on a substrate.
Figure 55:
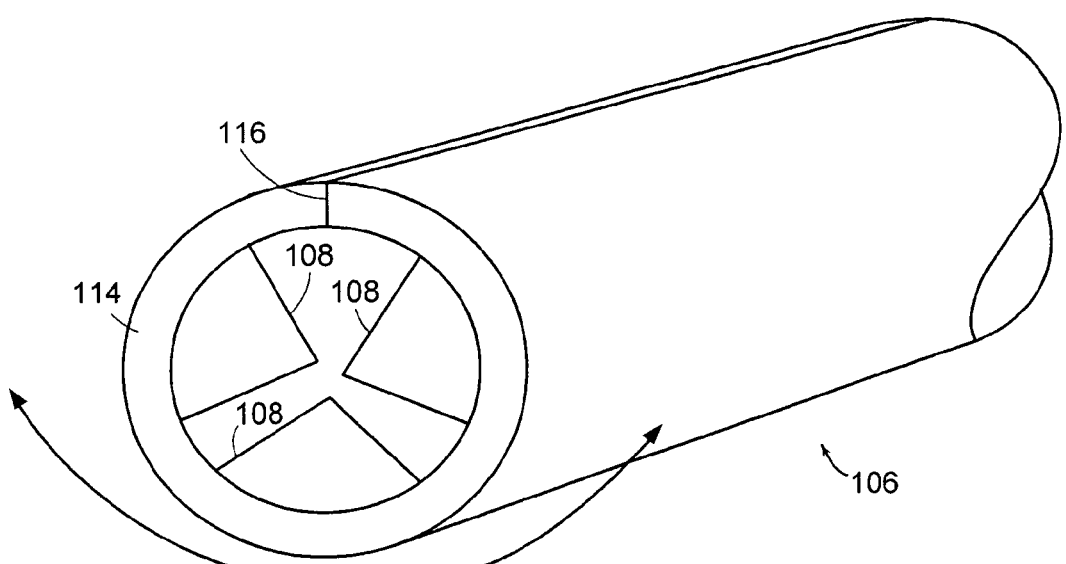
FIG. 55 is a perspective view of the substrate of FIG. 54 formed into a retroreflective thread enclosing the microstructures therein.
Figure 56:
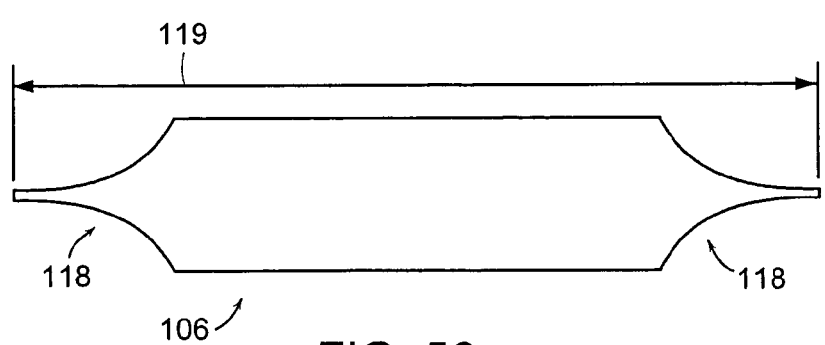
FIG. 56 is a side view of a retroreflective thread having ends thereof sealed in accordance with an embodiment of the invention.

FIGS. 54 and 55 illustrate an embodiment of a thread 106 configured to retroreflect light in at least three directions. In other embodiments, the thread 106 is configured to retroreflect light in four or more directions. FIG. 56 is a side view of a thread 106 that has each end 118 pinched to seal or hermetically close the interior of the thread. In other embodiments, the thread 106 can be made with a progressive injection compression molding process that can use thermoplastic or thermoset materials. In further embodiments, non-optical mechanical-structured fibers can be formed this way.

Figure 57:
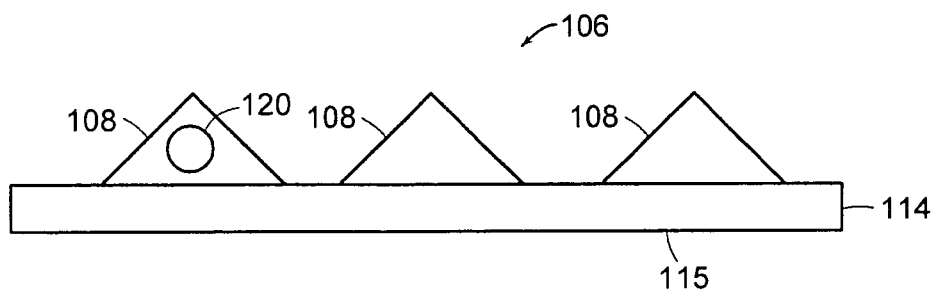
FIG. 57 is a side view of microstructures formed on a substrate with at least some of the microstructures including air spheres.

FIG. 57 illustrates an embodiment of an unformed retroreflective thread 106 in which air spheres 120 are provided in at least some of the microstructures 108, as disclosed in U.S. Pat. No. 5,592,330, which issued to Bernard on Jan. 7, 1997, the entire teachings of which are incorporated herein by reference. The outside surface 115 of the substrate 114 can include a moth-eye structured surface and/or a textured surface to reduce or eliminate gloss and glare on the finished thread 106.

Figure 58:
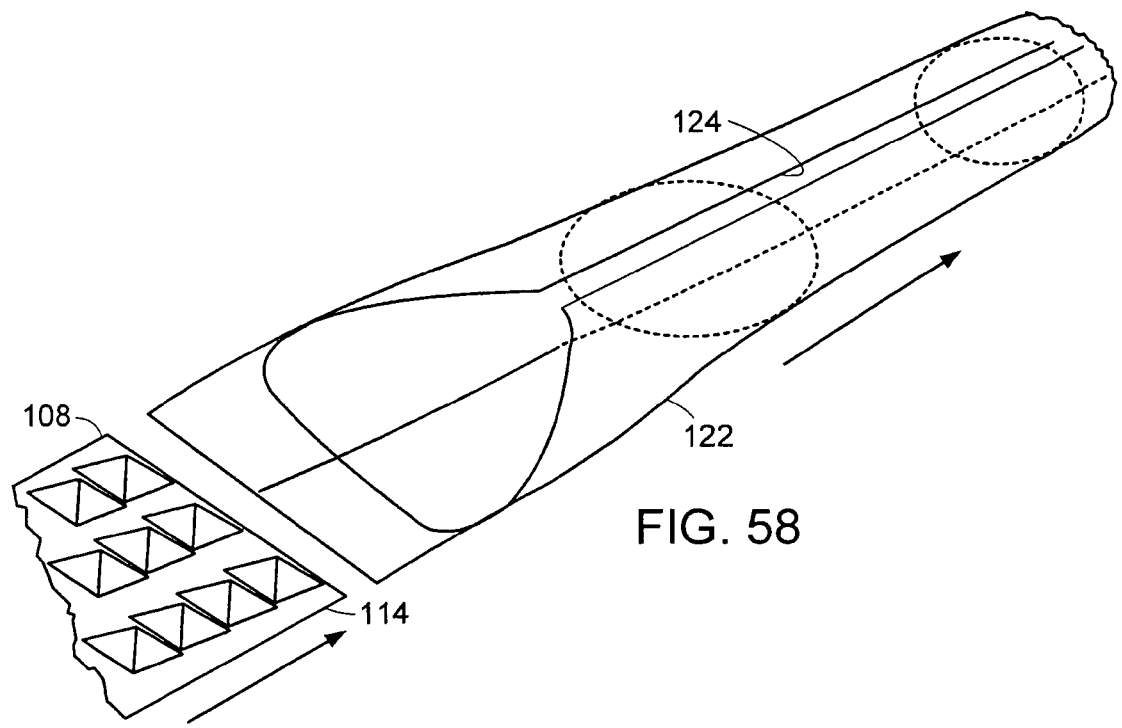
FIG. 58 illustrates a manufacturing method of wrapping a substrate around microstructures positioned thereon to form retroreflective threads.
Figure 59:
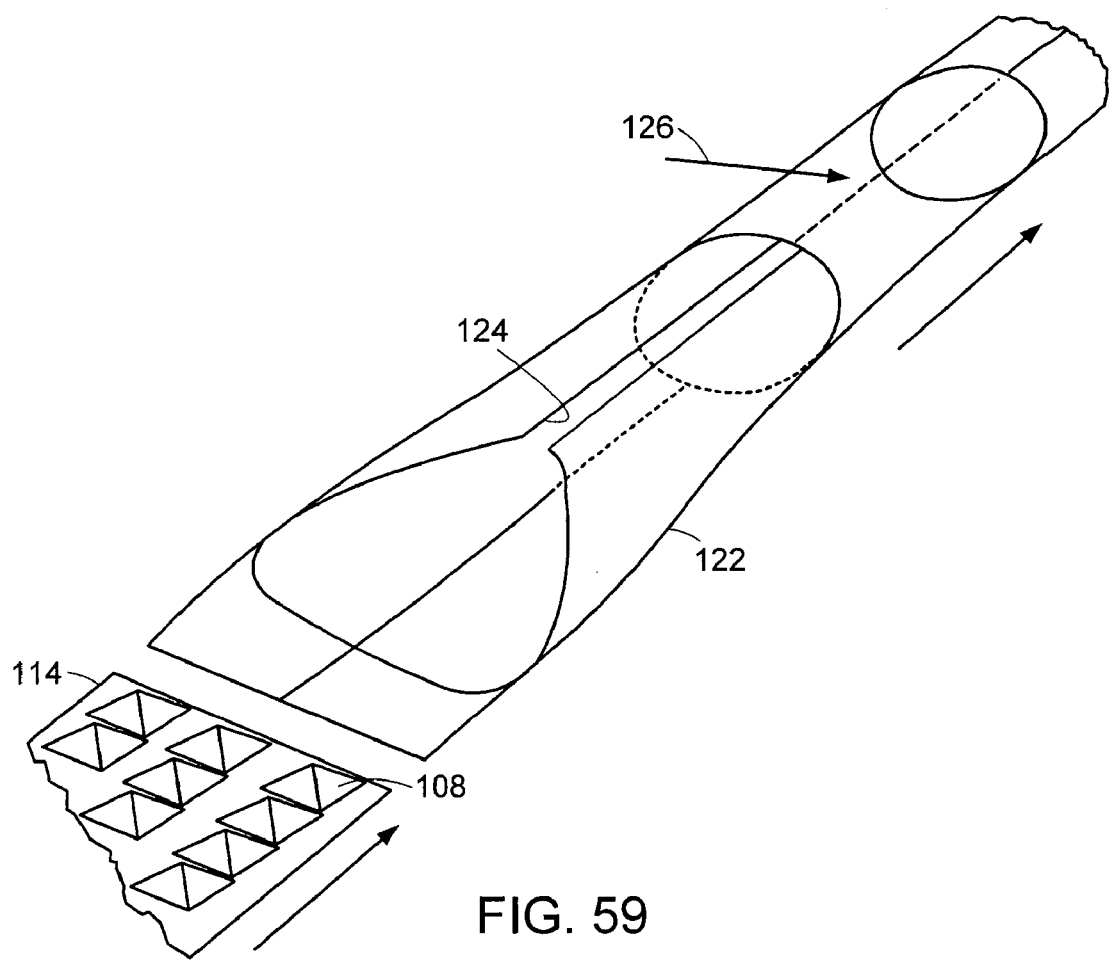
FIG. 59 is similar to FIG. 58 but wherein heat is used to join walls of the substrate together at a seam to form the retroreflective threads.

FIG. 58 illustrates one embodiment of a manufacturing tool 122 used to enclose or wrap the substrate 114 around the microstructures 108. Heat can be applied in channel 124 to seal the thread at area 116. FIG. 59 illustrates another embodiment of a manufacturing tool 122 used to form threads 106. Heat or a bonding agent, such as a solvent or adhesive, applied at seam 126 attaches the substrate walls together to enclose the microstructures 108 therein.

Figure 60:
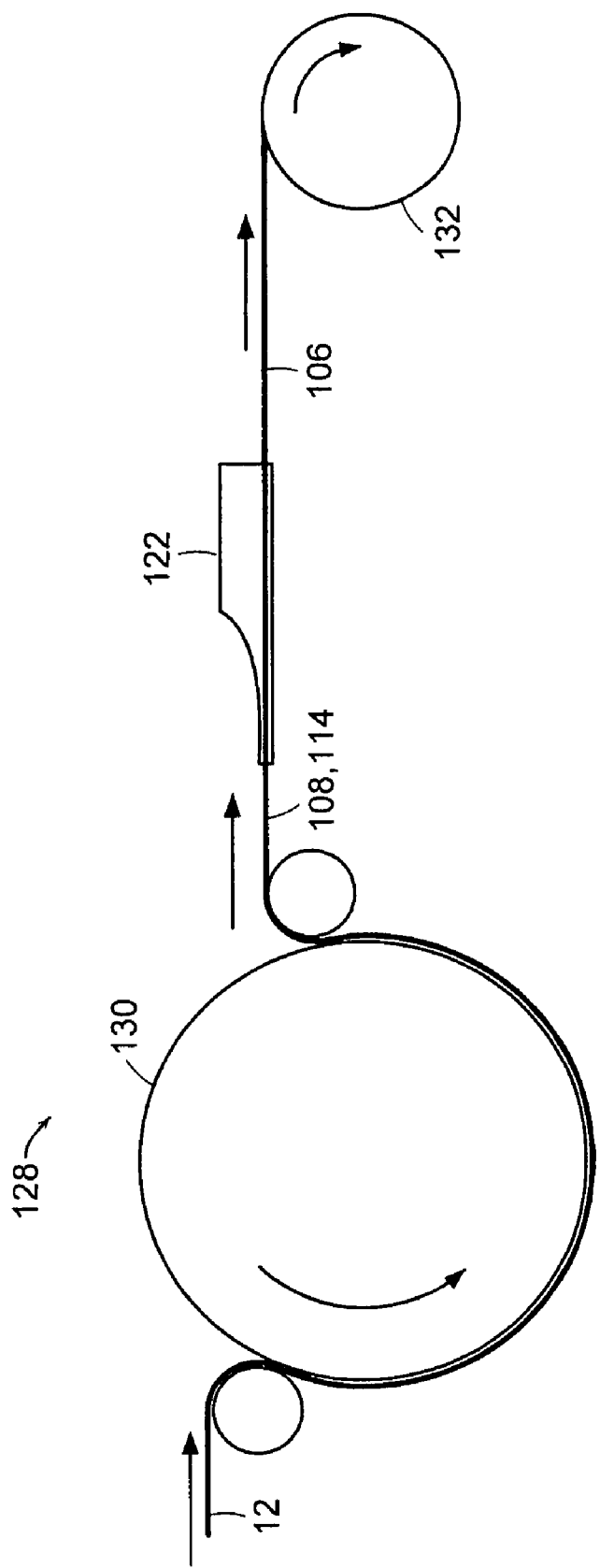
FIG. 60 is a schematic of a system used to form retroreflective threads in accordance with another embodiment of the invention.

FIG. 60 illustrates one embodiment of a manufacturing system 128 used to form retroreflective threads 106. A substrate 12 is fed against a drum 130 that casts microstructures 108 thereon. The substrate 114 and microstructures 108 are fed into a tool 122 that forms hollow threads 106 that are wound up on spool 132.

In further embodiments, a similar manufacturing process can be used to form retroreflective optical structures of various shapes and sizes. In one embodiment, cube-corner prisms having a pitch in the range of between about 150 to 460 micrometers (0.006 to 0.018 inches) and a height in the range of between about 76 to 230 micrometers (0.003 to 0.009 inches) are provided on a substrate 114 that is then formed by tool 122 into a hollow structure. For example, cross-sectional shapes of the hollow structure can include circular, rectangular, oblong, or other desired shapes. The hollow structures can be of various sizes depending on the application. For example, a rectangular-shaped hollow structure can be used to form retroreflective signs that can be used at roadside construction sites. In specific embodiments, the substrate 114 has a thickness in the range of between about 255 to 1,016 micrometers (0.010 to 0.040 inches) and the structure is substantially circular-shaped in cross-section having an outside diameter of up to about 15 centimeters (6.0 inches). In another embodiment, an optical structure that is substantially rectangular-shaped in cross-section has a thickness of up to about 2.5 cm (1 inch) and a width of up to about 31 cm (1 foot). In these embodiments, a single structure 114 can be used to form the outer layer.

Figure 61:
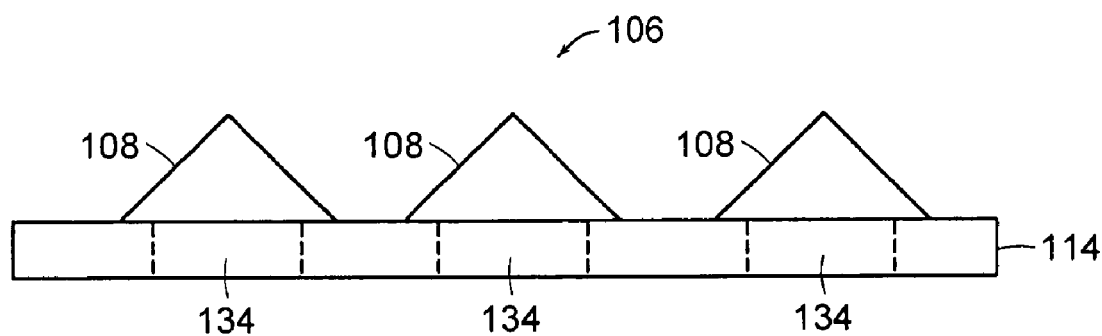
FIG. 61 is a side view of a substrate having microstructures therein in which material that forms the microstructures extends through the substrate.
Figure 62:
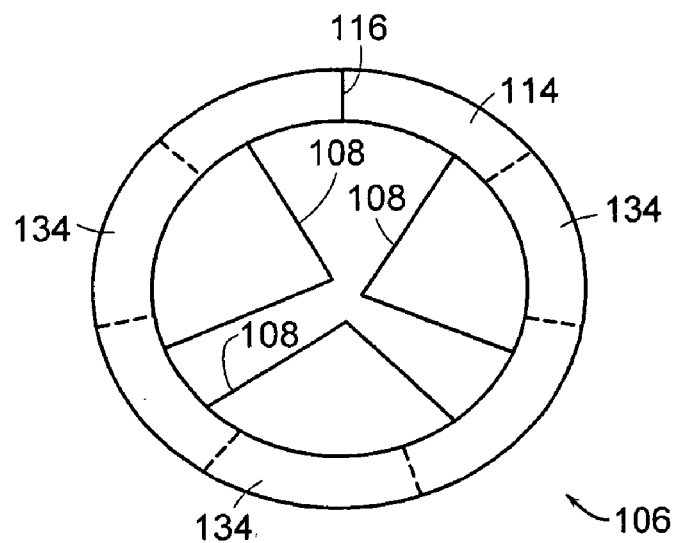
FIG. 62 is a cross-sectional view of a retroreflective thread formed from the structure of FIG. 61.
Figure 63:
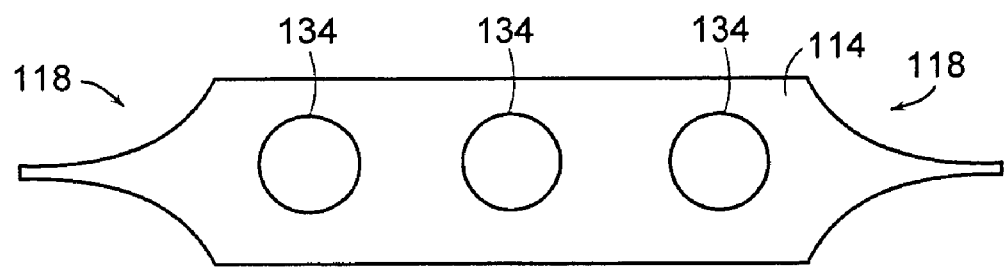
FIG. 63 is a side view of the retroreflective thread of FIG. 62.

FIGS. 61-63 illustrate another embodiment of a retroreflective thread 106 in which the substrate 114 is perforated or formed with apertures 134 before the microstructures 108 are formed thereon. As the microstructures 108 are cast onto the substrate 114, resin fills the perforations or apertures 134 such that the material that forms the microstructures extends through the substrate. One advantage of this configuration is that material that forms substrate 114 does not necessarily have to be as transparent as the material that forms the microstructures 108. Thus, high temperature thermoplastic substrate materials that are not as transparent as the microstructure material can be used to form the substrate 114. In other embodiments, the substrate 114 and/or microstructures 108 can be formed from colored and/or fluorescent material(s). For example, the thread 106 can be configured to have a daytime color and retroreflect a different color.

In other embodiments, the threads, fibers, or other optical structures disclosed herein can be formed by an injection process, for example, an injection-compression process. In specific embodiments, thermoplastics or thermoset plastic materials can be used.

Figure 64:
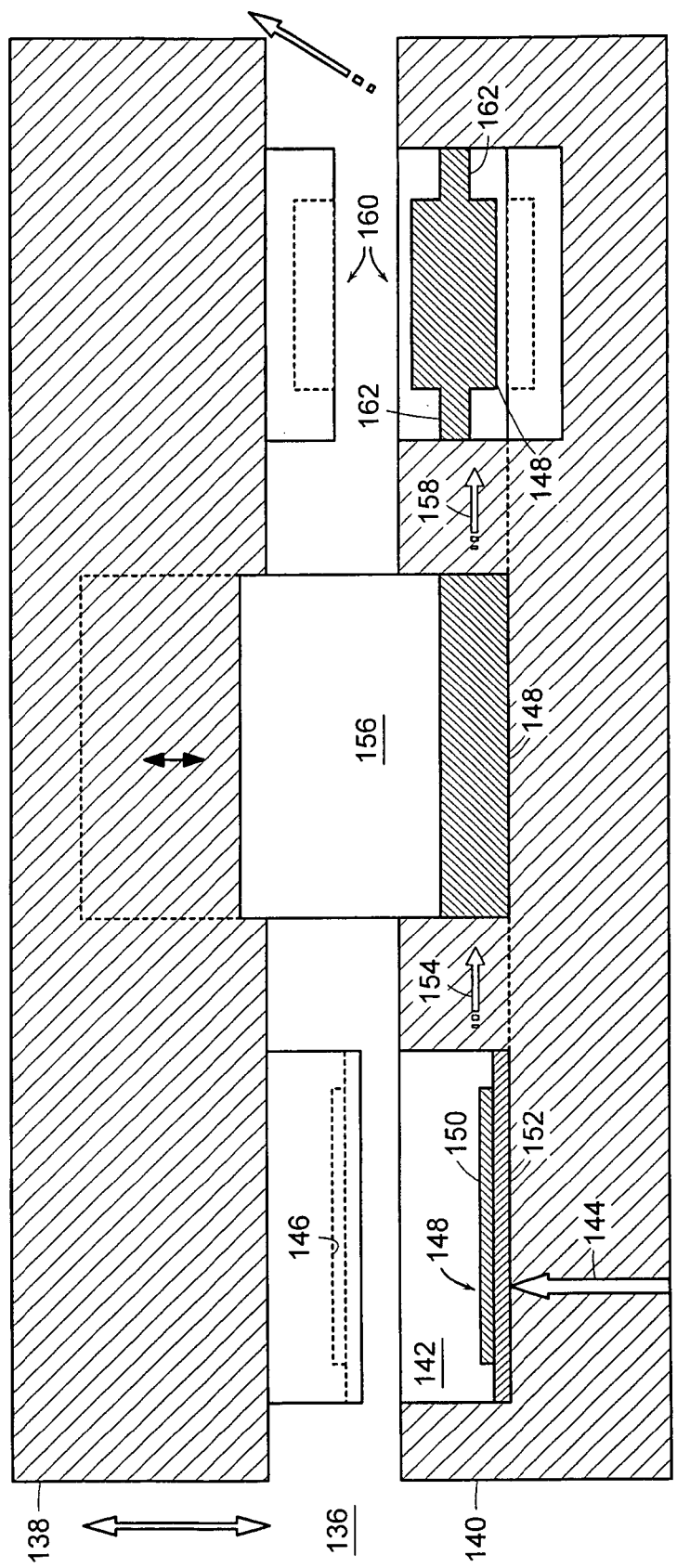
FIG. 64 is a schematic of a mold used to form optical structures in accordance with embodiments of the invention.
Figure 65:
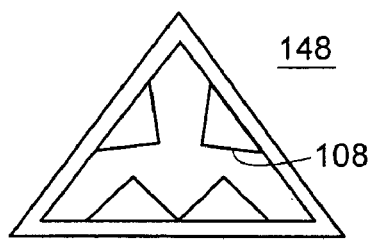
FIG. 65 is a cross-sectional view of an optical structure in accordance with an embodiment of the invention.
Figure 66:
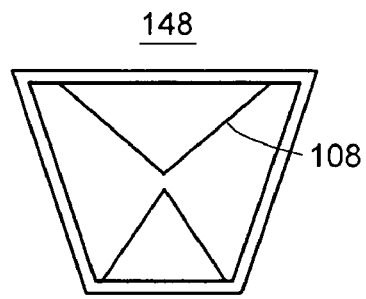
FIG. 66 is a cross-sectional view of an optical structure in accordance with another embodiment of the invention.
Figure 67:
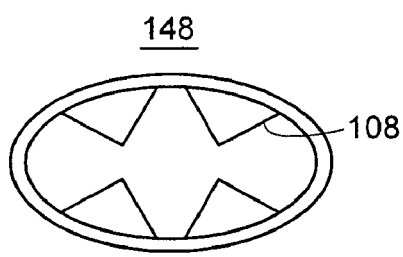
FIG. 67 is a cross-sectional view of an optical structure in accordance with a further embodiment of the invention.
Figure 68:
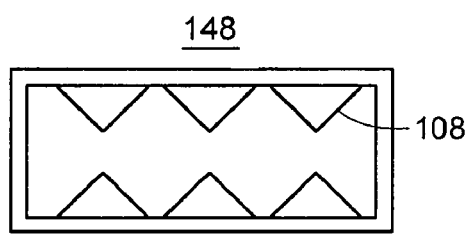
FIG. 68 is a cross-sectional view of an optical structure in accordance with yet another embodiment of the invention

FIG. 64 illustrates an embodiment of a mold 136 that can be used to form optical structures in accordance with aspects of the present invention. In this particular embodiment, the mold 136 includes two halves 138, 140. In this embodiment, mold half 138 is moveable relative to mold half 140, i.e., half 140 is stationary. In other embodiments, mold half 140 can be moveable relative to stationary mold half 138 or each half can be moveable, i.e., neither half is stationary. Plastic material 144, which can include a thermoplastic material in one embodiment, is introduced into cavity 142 that is formed in mold half 140.

Mold half 138 includes a recess 146 that forms the optical structure. In this embodiment, the recess 146 is configured to form an optical structure 148 having linear prisms 150 integrally formed on a substrate 152 (see, for example, the structure illustrated in FIG. 54). The mold half 138 is then moved upwards and the optical structure 148 is moved in the direction of arrow 154 into a tool 156 that forms/shapes the structure 148 into a geometric structure, such as a square, circle, etc.

The optical structure 148 is then moved in the direction of arrow 158 into a sealing tool 160 that pinches and seals ends 162 of the optical structure 148, for example, with heat and/or pressure. The structure 148 is then ejected from the mold 136. Thus, a method is provided for mass producing discrete optical structures that can include fibers or threads. The cost of the tooling is relatively low.

FIGS. 65, 66, 67, and 68 illustrate various exemplary cross-sectional shapes of optical structures 148 that can be formed, for example, by the mold 136 illustrated in FIG. 64. Other cross-sectional shapes can be provided in accordance with further embodiments of the invention. In further embodiments, the optical structures can be formed by an extrusion process.

In further embodiments, the thread 106 or optical structure can have light-scattering or redirection properties that improve the uniformity of the light distribution. For example, the substrate 114 can include a textured surface. In other embodiments, the microstructures 108 can include multi-orientation cube-corner sheeting as disclosed in U.S. Pat. No. 6,036,322, which issued to Nilsen et al. on Mar. 14, 2000. In further embodiments, the microstructures 108 can include cube-corner prisms having one or more windows in at least some of the facets as disclosed in U.S. Pat. No. 5,565,151, which issued to Nilsen on Oct. 15, 1996. In other embodiments, the microstructures 108 can include glittering cube-corner retroreflective sheeting as disclosed in U.S. Pat. No. 5,840,405, which issued to Shusta et al. on Nov. 24, 1998. In any of the embodiments, the microstructures 108 can include cube-corner prisms that have a reflective layer, such as a metal layer, formed on the facets. The microstructures 108 can include diced retroreflective sheeting as disclosed in U.S. Pat. No. 4,202,600, which issued to Burke et al. on May 13, 1980. The entire teachings of each of these patents are incorporated herein by reference.

In further embodiments, any of the components, optical structures, chips, flakes, threads, fibers, etc. can be selected. With one or more polymers, the selected component can be mixed into or provided within or coated on or combinations thereof.

The threads 106 of the present application can be used to create a breathable fabric, which can be tightly or loosely woven and/or retroreflective to form garments, such as jackets, sweaters, trousers, vests, and fire coats. In specific embodiments, virtually any retroreflective light distribution can be created. A woven fabric mesh can be used for garments, such as vests, jackets, or pants, or can be put in or on a film such as a polymer film. In other embodiments, the polymer film can be thin, elastomeric, flexible, or combinations thereof, for flexible applications such as garment tape, roll-up signs (RUS), tarpaulins, cone collars, etc., and thick, hard, and/or rigid applications for applications, such as barricades, pipes, signs, etc. The fibers or threads 106 can be disposed in a slurry, moved onto a paper making belt, pressed and fused together, and dried to form a synthetic retroreflective paper of fabric. High temperature fibers or threads 106 can be woven or disposed within firemen's and other emergency service garments to provide nighttime safety. In other embodiments, the threads 106 can be woven or formed into yarn, rope, or other structures, such as retroreflective mesh fences.

The hollow nature of the fibers and threads provides added flotation to devices, such as jackets, life rings, etc. Also, the hollow nature of the fibers and threads provides insulation to many types of garments and structures.

The fibers and threads of embodiments of the present invention and products formed from the same are difficult to counterfeit. Counterfeiters currently take optical structures and form tooling directly from the face of the structure. Because optical structures of the present application have microstructures on the inside of the structure, counterfeit molds cannot be easily produced.

Additionally, since the optical structures, including fibers and threads, can be woven into garments, the entire garment can be retroreflective, for example, to improve visibility of a fireman or jogger. Similarly, chips and flakes can be mixed in with coatings, such as paint, to cover substantially all of the product, for example, a cone or boat, to improve visibility so as to be recognizable as a specific object. In other embodiments, the threads 106 can be enclosed inside elastomeric substrate materials, such as roll-up signs (RUS), channelizers, and cone collars.

Thus, seamless, single layer, wide-width, light-redirecting optical structures, such as films, threads, and fibers are provided in accordance with embodiments of the present invention. Air-backed optical structures of the present application do not have a "gray" appearance that metalized embodiments can provide. Air-backed optical structures can provide a more pleasing daytime appearance.

In any of the embodiments, any of the materials used to form components 10 or the substrate can include fluorescent dyes or pigments. In particular embodiments, high temperature thermoplastics can be used to form any of the structures disclosed herein, such as substrate 12 or elements 14. For example, the high temperature thermoplastic can include polybenzimidazole (PBI), polyaryletherketones (PAEK), such as polyetherketone (PEK), polyetherketoneketone (PEKK), and polyetheretherketone (PEEK), polyphenylene sulfide (PPS), polyimides, such as polyetherimide (PEI) and polyamideimide (PAI), polyesters, such as polybutylene terephthalate (PBT), polyethylene terephthalate (PET), and polycyclohexamethylterephthalate (PCT), liquid crystal polymers, which can be polymerized from hydroxybenzoic acid, hydroxynaphthoic acid or dihydroxy-biphenyl, sulfone polymers, such as polysulfone (PSU), polyethersulfone (PES), and polyphenylsulfone (PPSU), polyamides, which are commonly called nylons.

Wide area optical structures can thus be produced by the methods disclosed herein. For example, large area seamless structures or sheeting can be implemented in the retroreflective, security, lighting, day lighting, front projection, rear projection, back lighting, and anti-glare applications. The microstructures in any of the embodiments can include cube-corner prisms, diffractive structures and lenses, lens arrays, prism arrays, linear Fresnel lenses, lenslets, alphanumeric characters, digital structures (e.g., raised structures that are designed to carry information that is binary, for example, a bar code), colored structures, color stiffening structures, textured structures, moth-eye structures, linear prisms and lenses, lenslets, fish-eye lens arrays, or other suitable microstructures.

Additionally, the materials including polyurea, as disclosed in U.S. patent application Ser. No. 10/634,122, filed on Aug. 4, 2003, the entire teachings of which are incorporated herein by reference, can be used to form any of the structures disclosed herein, including the substrate 12 and elements 14.

While this invention has been particularly shown and described with references to various embodiments thereof, it will be understood by those skilled in the art that various changes in form and details may be made therein without departing from the scope of the invention encompassed by the appended claims.

What is claimed is:

1. An optical structure comprising:
   a substrate; and
   a plurality of two-sided optical components, each side of each component having optical microstructures, the components being disposed along the substrate, wherein at least a portion of one side of at least some of the components is air-backed and the other side of the at least some of the components is substantially wetted-out by a material of the substrate, the substrate includes at least one adhesive selected from a group consisting of a substantially transparent heat-activated or substantially transparent pressure-sensitive adhesive, wherein the adhesive is disposed along a substantially transparent top film.

2. The optical structure of claim 1 further comprising a carrier film disposed along the substantially transparent top film.

3. An optical structure comprising:
   a substrate; and
   a plurality of two-sided optical components, each side of each component having optical microstructures, the components being disposed along the substrate, wherein at least a portion of one side of at least some of the components is air-backed and the other side of the at least some of the components is substantially wetted-out by a material of the substrate, the substrate includes at least one adhesive selected from a group consisting of a substantially transparent heat-activated or substantially transparent pressure-sensitive adhesive, wherein at least some of the two-sided optical components are partially embedded within the adhesive to substantially wet-out one side of at least some of the components, the other side of the at least some of the components being air-backed.

4. The optical structure of claim 3 further comprising a backing layer disposed over the air-backed side of the at least some components.

5. The optical structure of claim 4 wherein the backing layer is substantially transparent for forming a transflector.

6. The optical structure of claim 4 wherein the backing layer is bonded to the adhesive at selective locations.

7. The optical structure of claim 6 further comprising a substantially transparent top film disposed along the adhesive, wherein the backing layer is bonded to the substantially transparent top film at selective locations.

8. The optical structure of claim 7 wherein the backing layer is bonded to the adhesive through heat sealing, radio frequency sealing, ultrasonic sealing, or hot lamination techniques.

9. An optical structure comprising:
   a substrate; and
   a plurality of two-sided optical components, each side of each component having optical microstructures, the components being disposed along the substrate, wherein at least a portion of one side of at least some of the components is air-backed and the other side of the at least some of the components is substantially wetted-out by a material of the substrate, the substrate includes at least one adhesive selected from a group consisting of a substantially transparent heat-activated or substantially transparent pressure-sensitive adhesive, wherein the adhesive has the same index of refraction as material that forms the plurality of two-sided components.

10. An optical structure comprising:
    a substrate; and
    a plurality of two-sided optical components, each side of each component having optical microstructures, the components being disposed along the substrate, wherein at least a portion of one side of at least some of the components is air-backed and the other side of the at least some of the components is substantially wetted-out by a material of the substrate and wherein the substrate includes a liquid-curable coating.

11. The optical structure of claim 10 wherein at least some of the plurality of two-sided optical components disposed along the substrate are partially embedded within the liquid-curable coating to substantially wet-out one side of the at least some components, the other side of the at least some components being air-backed.

12. The optical structure of claim 11 wherein pressure is used to partially embed the components within the coating.

13. The optical structure of claim 10 further comprising a substantially transparent top film disposed along the liquid-curable coating.

14. The optical structure of claim 10 wherein the liquid-curable coating has the same index of refraction as material that forms the plurality of two-sided optical components.

15. A method for forming an optical structure comprising: providing a substrate; and
providing a plurality of two-sided optical components alone the substrate, wherein at least one side of substantially all of the components is air-backed and the other side of substantially all of the components is substantially wetted-out, wherein the components include cube- corner prisms and wherein the substrate is a first substrate, further comprising providing the cube-corner prisms along a plurality of second substrates.

16. A method for forming an optical structure comprising: providing a substrate; and providing a plurality of two-sided optical components along the substrate, wherein at least one side of substantially all of the components is air-backed and the other side of substantially all of the components is substantially wetted-out, wherein the substrate includes a substantially transparent adhesive selected from the group consisting of heat-activated adhesive and pressure-sensitive adhesive and wherein the two-sided components are partially embedded within the adhesive to wet-out the other side of substantially all of the components.

17. The method of claim 16 further comprising a backing layer disposed over the air-backed side of the components for forming a transflector.

18. The method of claim 17 wherein the substrate includes a liquid-curable coating and wherein the plurality of two-sided components disposed along the substrate are partially embedded within the liquid-curable coating to wet-out the other side of substantially all of the components.

19. The method of claim 18 wherein pressure is used to partially embed the components within the coating.

20. The method of claim 18 further comprising a substantially transparent top film disposed along the liquid-curable coating.

* * * * *